United States Patent
Champaneria

(10) Patent No.: US 10,318,926 B2
(45) Date of Patent: Jun. 11, 2019

(54) METHOD AND SYSTEM FOR MANAGING, MATCHING, AND SOURCING EMPLOYMENT CANDIDATES IN A RECRUITMENT CAMPAIGN

(71) Applicant: ExpertHiring, LLC, Piscataway, NJ (US)

(72) Inventor: Paul Champaneria, Branchburg, NJ (US)

(73) Assignee: ExpertHiring, LLC, Piscataway, NJ (US)

( * ) Notice: Subject to any disclaimer, the term of this patent is extended or adjusted under 35 U.S.C. 154(b) by 0 days.

(21) Appl. No.: 15/651,370

(22) Filed: Jul. 17, 2017

(65) Prior Publication Data

US 2019/0019159 A1  Jan. 17, 2019

(51) Int. Cl.
| | |
|---|---|
| *G06Q 10/10* | (2012.01) |
| *G06F 16/951* | (2019.01) |
| *H04W 4/14* | (2009.01) |
| *G06Q 50/00* | (2012.01) |

(52) U.S. Cl.
CPC ....... *G06Q 10/1053* (2013.01); *G06F 16/951* (2019.01); *G06Q 10/1095* (2013.01); *H04W 4/14* (2013.01); *G06Q 50/01* (2013.01)

(58) Field of Classification Search
USPC .................................................. 705/320, 321
See application file for complete search history.

(56) References Cited

U.S. PATENT DOCUMENTS

| | | | |
|---|---|---|---|
| 7,457,764 B1 * | 11/2008 | Bullock | G06Q 10/06 705/7.14 |
| 8,156,051 B1 | 4/2012 | Shah et al. | |
| 8,645,284 B2 | 2/2014 | Nanda et al. | |
| 9,715,496 B1 * | 7/2017 | Sapoznik | G06F 17/279 |
| 2001/0042000 A1 * | 11/2001 | Defoor, Jr. | G06Q 10/063112 705/7.14 |

(Continued)

FOREIGN PATENT DOCUMENTS

CA    2929140 A1    11/2016

OTHER PUBLICATIONS

International Search Report and Written Opinion dated Aug. 23, 2018 in corresponding International Application No. PCT/US18/42380; 14 pages.

*Primary Examiner* — Andrew B Whitaker
(74) *Attorney, Agent, or Firm* — Maier & Maier, PLLC

(57) ABSTRACT

A method and system for automating some aspects of a recruiting process, which may implement rules permitting the processes of sourcing candidates, setting up job interviews, and responding to candidate questions to all be automated with a computer. Such a system may match resumés and job descriptions with a scoring system, and may initiate communications between one or more candidates and a recruiter once an appropriate number of matches have been found. The system may then be configured to field responses to commonly asked questions from a question database, and notify the recruiter if a question is asked that it cannot answer, and may further be configured to proactively ask questions to the candidate if desired. This may allow recruiters to focus on the highest level of vetting, and on aspects of the recruitment process such as promoting the hiring company and salary negotiations.

20 Claims, 8 Drawing Sheets

(56) References Cited

U.S. PATENT DOCUMENTS

| | | | |
|---|---|---|---|
| 2006/0167834 A1 | 7/2006 | Rubel, Jr. | |
| 2009/0037541 A1 | 2/2009 | Wilson | |
| 2009/0245500 A1* | 10/2009 | Wampler | H04M 3/42382 |
| | | | 379/265.09 |
| 2009/0276209 A1* | 11/2009 | Dane | G06F 17/271 |
| | | | 704/9 |
| 2011/0295759 A1* | 12/2011 | Selvakummar | |
| | | | G06Q 10/063112 |
| | | | 705/321 |
| 2012/0185402 A1* | 7/2012 | Lajoie | G06Q 10/10 |
| | | | 705/321 |
| 2012/0265770 A1* | 10/2012 | Desjardins | G06Q 10/06 |
| | | | 707/748 |
| 2013/0187926 A1* | 7/2013 | Silverstein | G06Q 10/105 |
| | | | 345/440 |
| 2013/0268451 A1 | 10/2013 | Pendyala et al. | |
| 2014/0122355 A1 | 5/2014 | Hardtke et al. | |
| 2014/0278682 A1* | 9/2014 | Kennell | G06Q 10/1053 |
| | | | 705/7.19 |
| 2014/0278683 A1* | 9/2014 | Kennell | G06Q 10/1053 |
| | | | 705/7.19 |
| 2015/0006421 A1* | 1/2015 | Pearson | G06Q 10/1053 |
| | | | 705/321 |
| 2015/0227891 A1* | 8/2015 | Cohen | G06Q 10/1053 |
| | | | 705/321 |
| 2016/0092837 A1* | 3/2016 | Panigrahi | G06Q 10/1053 |
| | | | 705/319 |
| 2016/0132833 A1* | 5/2016 | Obeid | G06Q 10/06 |
| | | | 705/321 |
| 2016/0255034 A1* | 9/2016 | Yuan | H04L 51/32 |
| | | | 709/206 |
| 2016/0321614 A1* | 11/2016 | Leslie | G06Q 10/1053 |
| 2016/0330597 A1* | 11/2016 | Kalkounis | G06F 17/276 |
| 2017/0270485 A1* | 9/2017 | Meier | G06Q 10/06398 |

\* cited by examiner

METHOD AND SYSTEM FOR MANAGING, MATCHING, AND SOURCING EMPLOYMENT CANDIDATES IN A RECRUITMENT CAMPAIGN

BACKGROUND

Hiring and recruitment of candidates for a position of employment is generally a long, complex process. Generally, the process operates as follows. First, an HR department of a company or organization will identify that there is a vacancy in a particular position or identify that there is a need to create a new position. HR must then identify what the duties and responsibilities of the position will be, and must establish minimum requirements, preferred qualifications, and a recruitment strategy for the position.

Then, HR must develop a position description to be provided to the public. This typically must balance factors like accurately describing the duties and responsibilities of the job while preserving appropriate levels of secrecy about how the organization operates, ensuring that the position description ranks high in the search results of a number of search engines, ensuring that the position description promotes the company, and ensuring that the posting complies with labor law.

While some recruitment is often done in-house (usually through a jobs board operated by the organization, or through an in-house recruiter if the organization is sufficiently large and has sufficient turnover), the task of recruiting candidates for the position is sufficiently onerous and specialized that, most often, recruitment is contracted out to a recruiter or staffing agency. The recruiter will, based on the position description developed by the company, attempt to source a number of appropriate candidates for the position and ensure that the candidates are appropriately qualified.

The process of "sourcing" a candidate refers to the process of proactively searching for qualified job candidates for positions which are currently open or which are planned to be open. Sourcing thus requires collecting relevant data about qualified candidates, such as their names, titles, and job responsibilities. This is targeted at both candidates who are not actively looking for job opportunities (passive job seekers) and candidates who are actively looking for job opportunities (active job seekers). Both passive and active job seekers are most often targeted based on digital job boards, social media, and based on various forms of networking, such as through professional or alumni organizations.

Countless hours are typically spent by recruiters on both sourcing and qualifying candidates for job openings, meaning that this process can often be expensive, particularly for a company that contracts out its recruitment. The widespread adoption of digital job boards have meant that the volume of résumés and applications has increased significantly, making this task progressively more difficult.

SUMMARY

A method and system for automating some aspects of a recruiting process may be described. Such a method may operate to match résumés and job descriptions, and may initiate communications between a candidate and a recruiter once an appropriate match has been found. This may allow recruiters to focus on the highest level of vetting, and on aspects of the recruitment process such as promoting of the hiring company and salary negotiations.

According to an exemplary embodiment, a method, which may be performed by a system configured to implement the method, may start with receiving, on an automated recruitment system, a job description or plurality thereof. The method may next include parsing, with the automated recruitment system, the job description, the step of parsing the job description including identifying one or more job requirements of the job description (such as, for example, the job title, the skills and experience required and preferred, the education requirements, the day-to-day duties and expectations of the position, and so forth). In some exemplary embodiments, the job description may include, or may be paired along with, identifiers of one or more job requirements of the job description (which may, for example, ensure that the job description is more easily parsed). For example, according to an exemplary embodiment, a hiring manager may specifically provide the top three to top five skills or types/level of experience that is needed for the job, along with the job description; in some exemplary embodiments, skills, experience, or other such qualities that have been indicated by a hiring manager as being important may be given additional weight in a matching and scoring process, if desired. The method may next include generating, on the automated recruitment system, a first data point matrix, the data point matrix based on the one or more job requirements. The method may next include automatically posting, with the automated recruitment system, on a network, one or more posts comprising the job description. The method may next include automatically maintaining, with the automated recruitment system, the one or more posts, which may be continued over a period of time.

Next, the method may include, for a plurality of candidates, performing a step of receiving, on the automated system, a sourced résumé of a candidate in the plurality of candidates (which may be, for example, a formal resume, or may be another source of candidate information such as a candidate social media profile), and parsing the sourced résumé, which may include identifying hiring information for the candidate; this hiring information may include any or all information relevant to the hiring of the candidate, such as the candidate's location, the candidate's desired salary, information related to past interactions with the candidate, and so forth. (In some exemplary embodiments, a "resume" may be multiple items or sources of information, and the desired candidate information may be assembled from each of these items or sources of information. For example, in an exemplary embodiment, certain information such as name, contact information, candidate summary information, work history of a candidate with their present employer, the candidate's current job title, the candidate's start and end dates of employment, and the candidate's education information may be parsed from a formal resume, and additional information from a jobs board or other source location may be combined with this formal resume candidate information.) The method may next include generating, on the automated recruitment system, a second data point matrix, the data point matrix being based on the hiring information for the candidate; generating, with a semantic engine of the automated recruitment system (or an analogous system or other means), a candidate score for the candidate by matching the hiring information in the second data point matrix to the one or more job requirements in the first data point matrix; and automatically sending, with the automated recruitment system, a contact message to the candidate. This contact message may be, for example, a list of top reasons to work for the employer, a more extensive job description, a link to apply for a position, or any other contact message that may be desired. Finally, the method may include receiving, on the automated recruitment system, a response of the candidate; and evaluating, on the automated recruitment system, the response of the candidate to determine if the response of the candidate is an intent to apply, a rejection, or a question.

When the response of the candidate is an intent to apply, in some exemplary embodiments, the candidate may communicate such an intent to apply by clicking a link to apply. In some exemplary embodiments, this may provide the candidate with an opportunity to review and update the information on file for the candidate, as well as provide additional information or additional documents where appropriate (for example, in some exemplary embodiments, the candidate may provide an updated resume or may provide additional information by filling out skills questions). The method may include adding the candidate to a curated list of candidates, and submitting the curated list of candidates to a hiring manager, recruiter, or similar party. When the response of the candidate is a rejection, the method may include ensuring that the candidate is not part of an active campaign, by, for example, removing the candidate from the campaign. (In some exemplary embodiments, the candidate may be asked why they are not interested before they are removed from the campaign, which may provide the candidate an opportunity to clarify or even retract their rejection; for example, in some exemplary embodiments, the candidate may be asked whether they are open to a new job right now, or whether they are simply interested in the position that was offered to them.) When the response of the candidate is a question, the method may perform at least one of automatically generating a response to the question (for example, through the use of an AI, or by determining if the question matches an entry in an auto-response database of the automated recruitment system and generating a response from the entry in the auto-response database) or sending a notification to an operator of the automated recruitment system indicating that the question cannot be automatically responded to. (In some exemplary embodiments, an auto-response database may access the candidate information and/or the job description information in addition to the auto-response database in order to generate a response specifically tailored to a particular job or a particular candidate.) Finally, once the campaign includes at least one candidate, the method may include submitting, with the automated recruitment system, the curated list of candidates, to an appropriate party (such as a hiring manager or recruiter); in an exemplary embodiment, this may be done immediately after a candidate has completed the application process or may be done in a batch of multiple candidates, as may be desired. In an exemplary embodiment, submission of the curated list of candidates may include submission of detailed information about the candidates in the campaign, such as the résumé of each candidate, details about the skills required for the job such as the number of required or suggested years of experience or the last year the skill was used, salary details, availability information for the candidate such as a date on which the candidate is available to start, and so forth.

In an exemplary embodiment, the method may further include performing the step of identifying, with a web-based or otherwise machine-based calendar system such as MICROSOFT OUTLOOK, a mutually acceptable time for scheduling an interview, and automatically scheduling an interview at the mutually acceptable time.

In an exemplary embodiment, the method may further include generating, from the one or more job requirements, one or more search strings for a job board search engine or other search engine; in some exemplary embodiments, a plurality of successive search strings may be provided, each of which has broader search parameters than the last search string in at least one way. In some exemplary embodiments, the combination or combinations of values, and the number of parameters, to be included in a search string may be determined manually, or may be determined automatically by the system based on settings such as the weight of importance assigned to one parameter or parameter value over another. In some exemplary embodiments, the generation of search strings may be performed before performing the other steps of the method or at an early stage of performing the steps of the method. This may enable manual sourcing to be performed more easily, alongside automatic sourcing. As such, the method may be able to incorporate candidate résumés from a plurality of sources, which may include, for example, résumés sourced from automated and manual job board searching, résumés submitted by candidates directly or through a job board, or résumés or other information retrieved from social media sites.

In an exemplary embodiment, the step of automatically posting one or more posts with the job description may further include the steps of automatically generating, from the job description, a base post; automatically formatting the base post into one or more site-specific posts, each of the site-specific posts having a format used by a specific website; and posting the site-specific posts on the specific websites. This may ensure that the information in each post is largely shared, but that differences (such as formatting differences) between multiple sites are taken into account.

In an exemplary embodiment, the method may further include identifying a website that does not permit at least one of automatic posting or automatic maintenance of posting; automatically generating a post to be made on the website, or an edit to be applied to a post on the website; and generating and sending a notification to an operator of the automated recruitment system. The notification may further include the post to be made on the website or the edit to be applied to the post on the website, to allow the operator (such as a recruiter) to make the post or make the edit quickly, after a brief review.

In an exemplary embodiment, the step of automatically maintaining, with the automated recruitment system, the one or more posts may constitute or may include at least one of updating the one or more posts to include new job description information, removing the one or more posts, or applying a visibility adjustment to the one or more posts.

In an exemplary embodiment, the plurality of candidates may include at least a primary group, the primary group being formed from candidates having a candidate score in excess of a primary score threshold. This plurality of candidates may further include a secondary group, the secondary group being formed from candidates having a candidate score in excess of a secondary score threshold but below the primary score threshold. In an embodiment, the method step of automatically sending, with the automated recruitment system, a contact message to the candidate, this message including an offer to apply for a position may be performed for each of the candidates in the primary group before being performed for any of the candidates in the secondary group.

In an exemplary embodiment, when the response of the candidate is a rejection, the candidate may be excluded from receiving at least one category of offer for at least one period of time. This may constitute excluding the candidate from at least one of offers in a particular industry segment, offers having a specific job title, offers having a specific job description, offers having a specific salary, offers having a specific job location, or other offers, as may be desired.

In an exemplary embodiment, when the response of the candidate is a question and not an intent to apply or a rejection, the method may include sending a further communication to the candidate requesting a second response.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Figure 1:
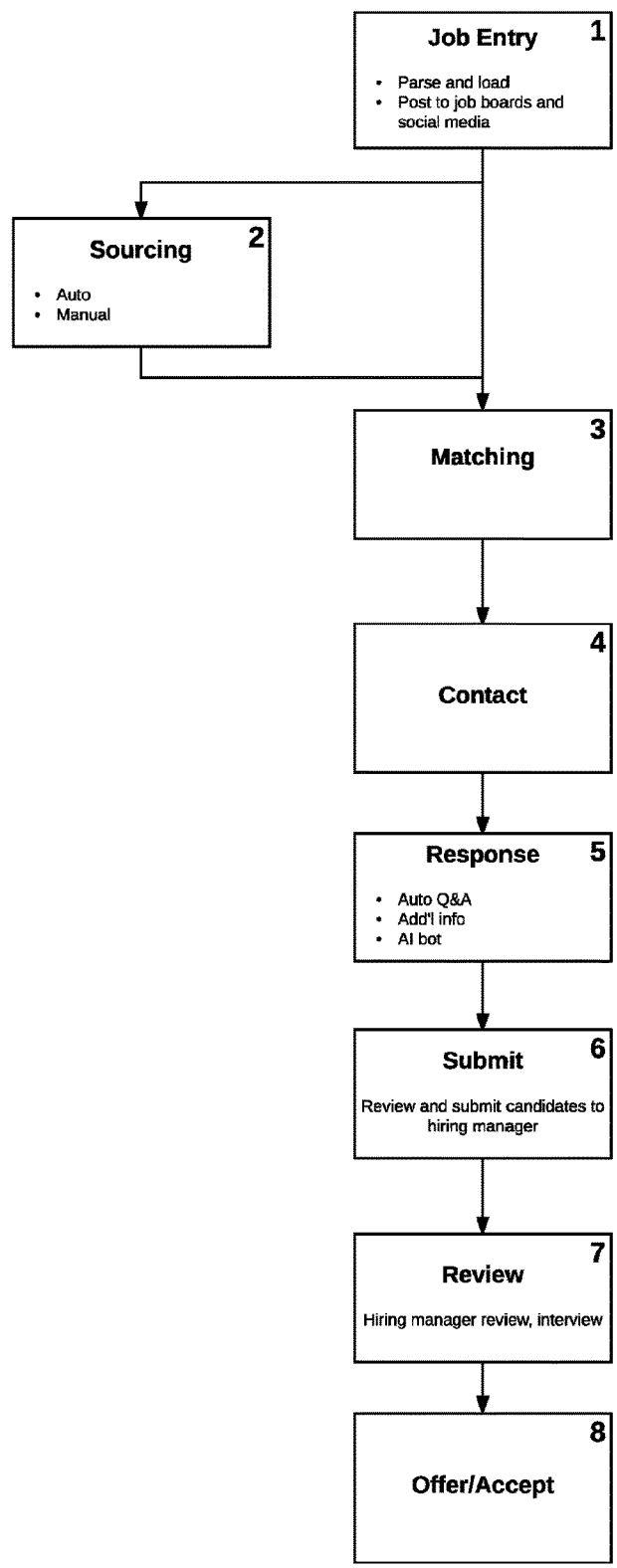
FIG. 1 is an exemplary embodiment of a flowchart depicting a method of automating a recruiting process.

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation. Further, as used in the specification, the term "résumé" may be used to refer to all information that may be solicited from or provided by a candidate for an employment position, including a résumé document, but also including, for example, social media information of the candidate, information provided by the candidate in response to questionnaires, data collected from a personal web page of the candidate or an employment web page of the candidate, or any other information that may be relevant to the hiring of the candidate.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

According to an exemplary embodiment, and referring generally to the Figures, various exemplary implementations of a method and system for automating a recruiting process may be disclosed. Such a method and system may function to better match candidates with job openings, and may implement rules permitting the processes of vetting candidates and setting up job interviews to be automated with a computer. In particular, the method and system may make use of a method for providing a candidate with a score for a particular job opening. The method and system may then collect any other information that may be necessary, and may be configured to notify employers about one or more high-scoring candidates that have been found for a job opening. The method and system may further operate to maintain bi-directional communication until such time as the position has been filled.

Such a system for automating the process of selecting and vetting candidates for a position may have numerous advantages. In particular, the system may substantially increase recruiter productivity by automating the communication process between the recruiter, candidate, and hiring manager, and by providing automatic responses to common questions. The system may also significantly reduce the time and expense required to train a recruiter in a particular field, and may even allow other employees to take on the specialized task of recruitment, allowing employees in specialized departments (such as engineering or IT) to more closely vet recruited candidates with their own specialized knowledge.

Turning now to exemplary FIG. 1, FIG. 1 displays an exemplary embodiment of a flowchart depicting a method of automating a recruiting process. Such a method may include several steps, including a job entry step 1, a sourcing step 2, a matching step 3, a contact step 4, a response step 5, a submission step 6, a review step 7, and an offer and acceptance step 8. In an exemplary embodiment, these steps may be run sequentially, in parallel, or in some combination of the two; for example, according to an exemplary embodiment, a matching process 3 and a sourcing process 2 may be run simultaneously, such that the matching process 3 performs matching on résumés already in the system, while the sourcing process 2 performs sourcing on newly-added or newly-updated résumés.

Figure 2:
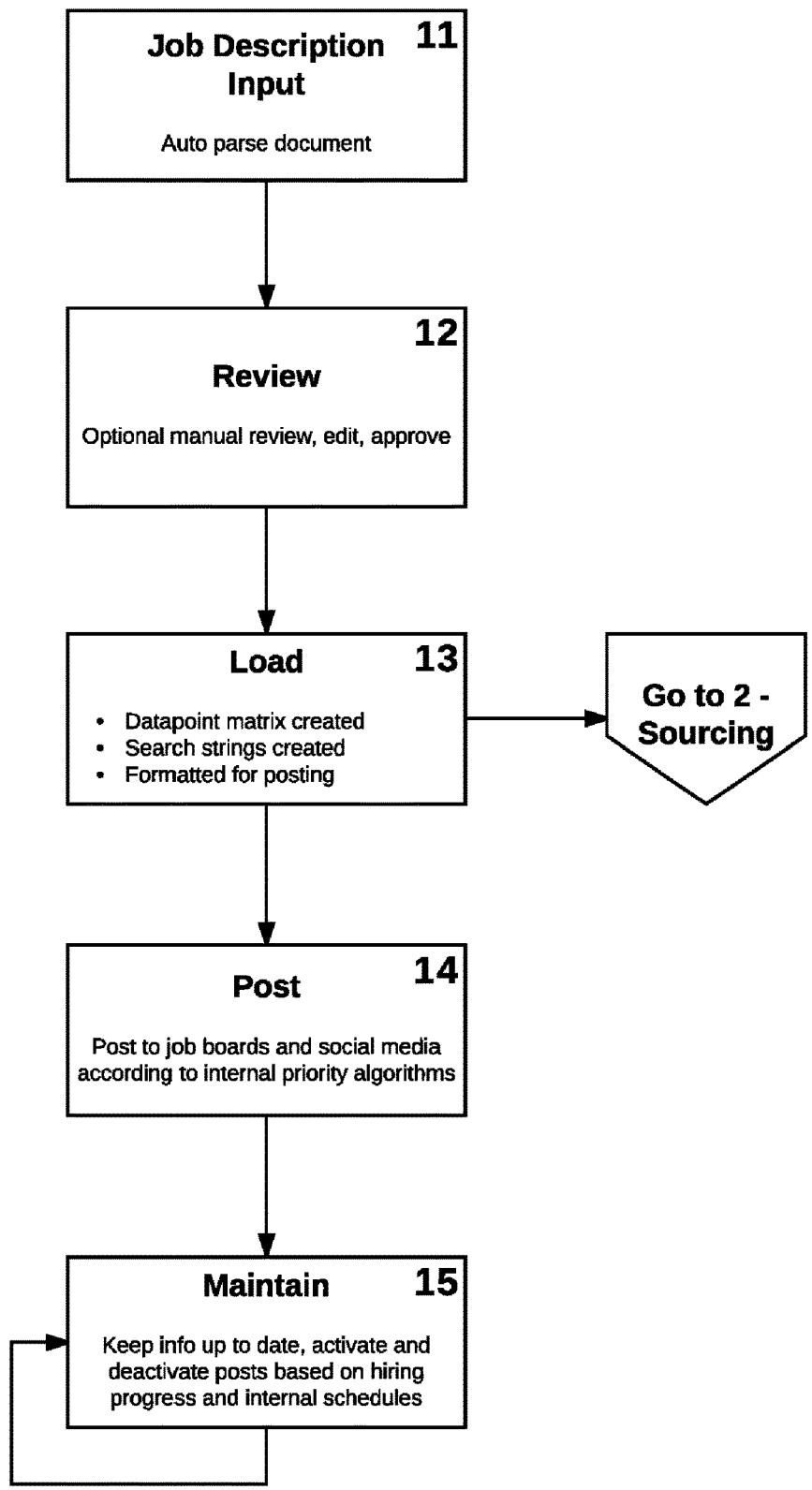
FIG. 2 is an exemplary embodiment of a flowchart depicting a method of performing a job entry step.

Turning briefly to exemplary FIG. 2, FIG. 2 displays, in more detail, an exemplary embodiment of a flowchart depicting a method of performing a job entry step 1. According to an exemplary embodiment, in a first step 11 of a job entry step 1, a job description may be input into the system. In some embodiments, the text of the job description, and any other information that has been provided by the hiring manager that may be outside of the job description, may be parsed by the system (for example, by a system configured to use natural language processing) and key points, concepts, and requirements of the job may be identified from the job description.

In a next step 12 of a job entry step 1, the information that had been automatically parsed from the job description in step 11 may be reviewed by a human operator, such as a recruiter. The recruiter may then elect to edit the information that had been produced in the automatic parsing step 11. In some exemplary embodiments, the recruiter may have to review and approve the information in order to continue with the job entry step 1; in other exemplary embodiments, the recruiter may have the option to do so.

In a next step 13 of a job entry step 1, the job description may be loaded into the system based on the parsing of step 11 (and optionally the manual review of step 12). A data point matrix may then be created in the system for subsequent matching of the information in the job description to information of one or more potential candidates for the position.

According to an exemplary embodiment, a data point matrix may be a data structure that may be represented by a multi-dimensional environment (that is, an environment having one or more axes) wherein each relevant piece of information in the data structure, i.e. each data point, can be represented by a point in the environment having a specific set of coordinates that define its position based on the relevancy of the information in the data point to the concepts or requirements that are represented by the axes or coordinate planes.

Various other representations of data may be constructed using the general framework of a data point matrix. For example, a data vector may be constructed within the data point matrix, which may be represented by a conceptual line that can be drawn through the locales of the greatest concentrations of data points in a data point matrix.

In some exemplary embodiments, a data point matrix (DPM), and/or a data vector (DV), which have been derived from a first entity may be compared to a DPM and/or DV that have been derived from a second entity, by using the first DPM or DV as a template to overlay onto the second DPM or DV. This may allow the relevancy of the first entity to the second entity to be evaluated. For example, according to an exemplary embodiment, a first DPM or DV may be a job description, and a second DPM or DV may be a résumé (or vice-versa). The job description and the résumé may thus be compared by overlaying the first DPM or DV over the second DPM or DV and examining the similarities.

In some exemplary embodiments, a system may make use of one or more alternative methods of matching information in the job description to information of one or more potential candidates for the position, in addition to the use of a data point matrix or instead of the use of a data point matrix. For example, according to some exemplary embodiments, a system may make use of, as a method of matching information in the job description to information of one or more potential candidates for the position: machine learning; one or more neural networks; multi-layer perceptrons; support vector machines; principal components analysis; Bayesian classifiers; Fisher discriminant analysis; linear discriminant analysis; maximum likelihood estimation; least squares estimation; logistic regressions; Gaussian mixture models; genetic algorithms; simulated annealing; decision trees; projective likelihood; k-nearest neighbor analysis; function discriminant analysis; predictive learning via rule ensembles; natural language processing, state machines; rule systems; probabilistic models; expectation-maximization; or hidden and maximum entropy Markov models. Other methods of matching information in the job description to information of one or more potential candidates for the position may be understood and may be used, as may be desired.

In an exemplary embodiment, the system may also generate, or may alternatively generate, one or more search strings for manual candidate searching, which may be used in, for example, a sourcing step 2. This search string may be or may include keywords targeted at identifying the candidate profiles that best match the job description. In some exemplary embodiments, a plurality of search strings may be generated, each of the search strings having broader search parameters than the search string previously used; in other exemplary embodiments, such search strings may be generated on demand if, for example, too few candidates are found using a narrower search string. In an exemplary embodiment, in each search string, the values used in the search string and the number of parameters used in the search string may be determined manually or automatically by the system, based on settings such as the weight of importance of one parameter or value over another parameter or value (or combination thereof).

According to an exemplary embodiment, the system may also handle formatting and submission of the job description for posting on one or more locations, such as on a job board or on a social media website. In some embodiments, formatting and submission of the job description may be tailored to the intended recipient or intended site on which the job description will be posted; for example, according to an exemplary embodiment, a more detailed version of the job description may be posted on a jobs board, and a less detailed version (that may refer applicants to another posting, such as the jobs board posting, if desired) may be posted on a social media web site.

In a next step 14 of a job entry step 1, the system may automatically provide the posting to one or more job boards, social media resources, or other advertising resources, such as may be desired, so that the posting can be posted. Job boards may include, for example, DICE.COM or MONSTER.COM. Social media resources may include, for example, LINKEDIN.COM or FACEBOOK.COM. Other advertising resources may include, for example, GOOGLE ADS or other internet advertising services.

In an exemplary embodiment, posting may be performed automatically by the system on those job boards, social media resources, or other locations where automatic posting is permissible. In an exemplary embodiment, posting may be performed manually on those job boards, social media resources, or other locations in which automatic posting is not permissible or is not well supported. In an exemplary embodiment, the system may have one or more priority algorithms that govern the priority with which it makes posts on particular resources. For example, according to an exemplary embodiment, a system may first post on a designated list of job boards, then post on social media, then purchase one or more ads from an ad service to advertise the posting to a wide market. The system may then generate one or more posts to be manually posted on one or more services, if desired, or may generate a list of one or more services on which posts must be manually written.

In a last step 15 of a job entry step 1, the system may function to maintain the postings that it has made. For example, according to an exemplary embodiment, the system may be configured to receive new job description information and may be configured to update the job descriptions that it has posted, or any other applicable job descriptions, in order to keep the job posting information up to date.

According to an exemplary embodiment, the system may also function to maintain what postings are visible. For example, in addition to making posts, it may be desired for the system to remove posts from one or more services, for example if a given position has been filled or if a sufficient number of apparently acceptable candidates has been found and the candidates are set to be interviewed. The system may also be configured to deactivate and/or reactivate posts, such that they are still stored on the service but are not visible when deactivated, and such that they are visible when reactivated. The system may also be configured to change the visibility of posts, if, for example, requirements change or the job posting has gone a long time without a sufficient number of applications being filed or without a sufficient number of high quality applications being filed. The system may also be configured to refresh the visibility of posts, where applicable; for example, on some services, posts may be displayed on the service in a ranked order based on the last activity that has taken place on the post, and it may be necessary to periodically bump or refresh the post in some way in order to enhance its visibility.

In some exemplary embodiments, some services may not support automatic maintenance of posts, just as some services may not support automatically making posts. In such embodiments, such maintenance may have to be performed manually instead. In an exemplary embodiment, the system may be configured to automatically generate a list of posts that cannot be automatically maintained and which have to be manually maintained. The system may also be configured to generate an indication of the type of maintenance (for example, modification of the post, activation of the post, deactivation of the post, or another kind of maintenance, as may be desired) that must be performed manually. In some embodiments, the system may be configured to provide an amended post that may be used as a guide for making the appropriate manual amendments to the post; for example, in an exemplary embodiment, when the system is provided with up-to-date information about the job posting, it may automatically generate amended posts for one or more services, the amended posts having the proper up-to-date information.

In an exemplary embodiment, maintenance of the posted job state and status on one or more external resources may be maintained automatically according to the priority algorithm. The priority algorithm may take into account factors such as, for example, the date of the original posting, the deadline by which it is desired to have hired a candidate for the position, the current hiring progress, other priorities and internal schedules or deadlines of the client, or any other considerations and conditions.

Figure 3:
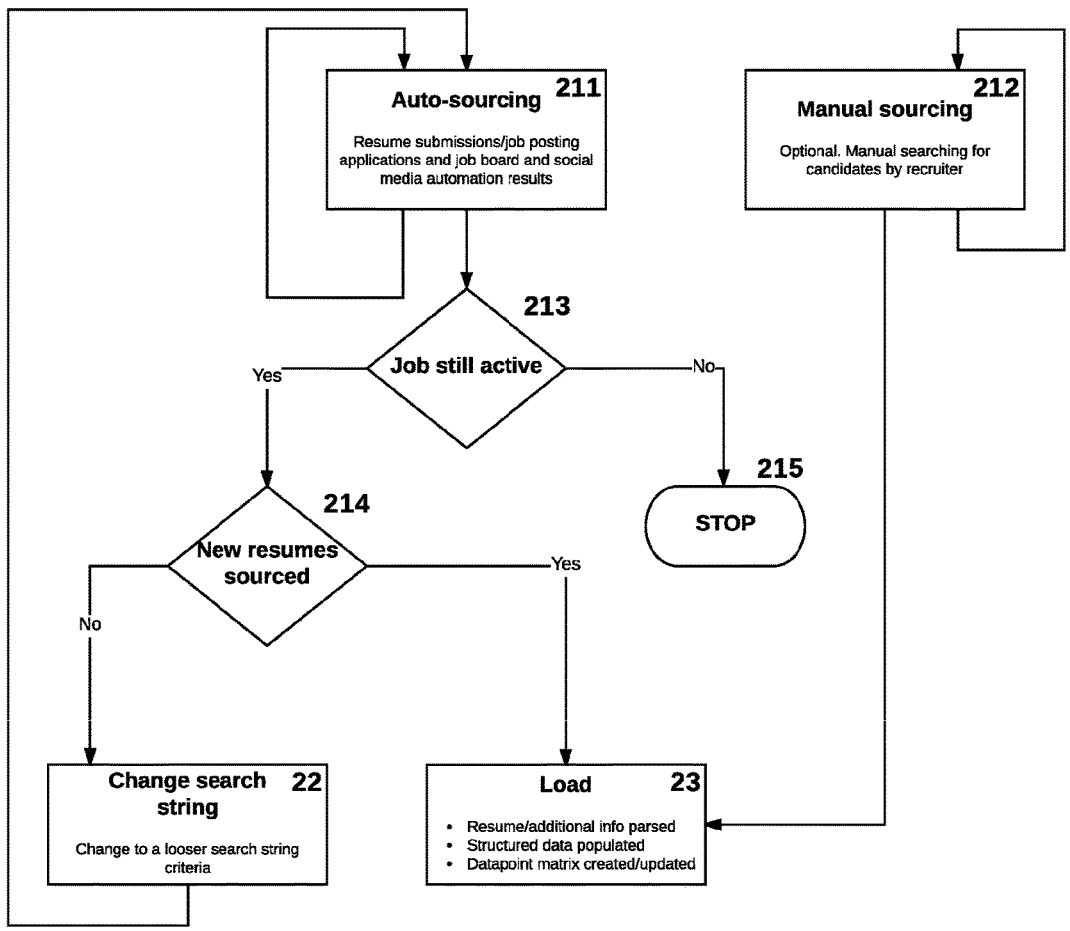
FIG. 3 is an exemplary embodiment of a flowchart depicting a method of performing a sourcing step.

Turning next to exemplary FIG. 3, FIG. 3 displays, in more detail, an exemplary embodiment of a flowchart depicting a method of performing a sourcing step 2. According to an exemplary embodiment, a system may receive inputs from automatic sourcing 211 and manual sourcing 212, and may in each case load résumés into the system in a loading step 23.

According to an exemplary embodiment, in an automatic sourcing step 211, candidates and résumés of candidates may be sourced automatically from job boards and from social media, as well as any other appropriate sources (such as, for example, resumes submitted by a candidate to an employment page of a company website, which may, for example, be forwarded to the recruiter for review). In a manual sourcing step 212, which may be optional in some exemplary embodiments, a recruiter may supplement automatic sourcing 211 by manually searching for candidates and performing traditional sourcing steps. In some exemplary embodiments, sourcing may be entirely optional; under some circumstances, sufficient numbers of résumés may already be on file to allow a desirable number of candidates to be retrieved from candidates already in the system, and as such it may not be necessary to source any additional candidates.

In an exemplary embodiment, automatic sourcing 211 may proceed as follows. In a first step, the system may determine whether the job that is to be automatically sourced for is still active 213. If the job is not still active 213, the system may stop performing the automatic sourcing 215. However, if the job is still active, the system may attempt to source a number of new résumés 214. If the system is able to source a desired number of new résumés 214, the information in the résumés, as well as any other accompanying information, may be passed to a loading step 23. If the system is not able to source a desired number of new résumés 214, the system may change the search string that it is using to perform automatic sourcing 22, such that it is using looser search string criteria. This may entail, for example, broadening the search parameters used in the search string; for example, in an exemplary embodiment, the system may search for a search string containing a plurality of desired skills and desired job titles, and each successively looser search string may have one fewer skill or job title. Other loosening parameters may include, for example, expanding the permissible distance between candidates and the job location (for example, from a radius of 50 miles to a radius of 100 miles; alternatively, a permissible distance could be eliminated entirely and candidates could be asked if they wish to relocate), expanding the permissible date range of the candidate's last activity on a job board or social media profile (for example, in a first case, candidates who have updated a job board posting or social media profile within the past two weeks may be identified as being the likeliest to be looking for a new job and may be selected, while in a second case, candidates who have updated a job board posting or social medial profile within the past month may be selected), Other methods of loosening the search string may also be envisioned. In some exemplary embodiments, the system may provide assistance with manual sourcing 212, which may be performed similarly; however, according to an exemplary embodiment, the system may merely create one or more exemplary search strings that a user can use to search one or more search engines, and may not automatically perform searching 211 with the search strings that it has generated.

According to an exemplary embodiment, an initial search string generated for use in either an automatic sourcing process 211 or a manual sourcing process 212 may include, for example, all of the skills and job requirements that were mentioned in the job description or otherwise provided by a hiring manager. The initial search string may further include, for example, one or more job titles that match the job description. For example, an initial search string for a software engineering position for a company with a code base largely in a particular language might include the title "senior software engineer," optionally may be further refined by adding the language proficiency desired by the company directly to the title (for example, "senior Python engineer"), and may include a list of skills such as proficiency in the Python language. During a loosening process, optionally, more than one job title could be added; for example, according to an exemplary embodiment in which an initial title used in an initial search string was "senior Python engineer," the additional titles "senior engineer" and "senior developer" could be added. During a loosening process, skills could also be removed, either instead of adding titles or in addition to adding titles; as such, looser search strings may progressively have more job titles and fewer skills. Skills may also be made optional; for example, for a particular position, it may be most desirable that a candidate for a senior developer position have proficiency in both the Python and Java languages, but acceptable if they have proficiency in either one, and as such a first search string may be generated requiring each of these skills and a second search string may be generated requiring one skill or the other.

In an exemplary embodiment, sourcing, whether automatic 211 or manual 212, may constitute active searching for candidates that match the general criteria for the job opening, as well as accepting submissions and applications from interested candidates via any of the commonly available communication channels, which may include (but which may not be limited to) a Web portal, email, a telephone (including, for example, mobile, landline, and SIP phones), fax/facsimile, SMS text messaging, social media posts or notifications, push notifications, device-based messaging such as VIBER or WHATSAPP, or any other method of communication. In particular, a method of communication that lends itself to automation may be employed in an auto-sourcing step 211, while a method of communication employed in a manual sourcing step 212 may not have to be (and may include, for example, methods like face-to-face networking).

In an exemplary embodiment, automatic sourcing may be performed on those job boards, social media resources, and other resources that allow automation, and manual sourcing may be performed on those job boards, social media resources, and other resources that do not allow automation. In some embodiments, manual sourcing may also be performed, to a limited degree, on those job boards and other resources that do allow automation, in order to confirm the results of the automated process, if desired.

In both automatic 211 and manual 212 sourcing, each sourced candidate may be associated, within the system, with the job that they are being sourced for. In some exemplary embodiments, candidates may be sourced to particular jobs or may be simultaneously sourced to more than one job, as desired.

In a loading step 23 of a sourcing step 2, a résumé (including a CV/resume document or any other information) of a sourced candidate or of more than one sourced candidate may be input into the system, and may be parsed. In an exemplary embodiment, the system may, in a parsing step, identify one or more concepts in the résumé, contact information of the candidate, the experience of the candidate, and any other relevant key points that may be applicable to the hiring of the candidate. The parsed data may then be structured and stored in a database.

In an exemplary embodiment, a data-point matrix may then be created for each résumé. According to an exemplary embodiment, a data-point matrix may be created for each résumé for each subsequent matching and ranking of that résumé. In some exemplary embodiments, a data-point matrix may already exist for a particular résumé (for example, if the sourced résumé is an update of a previously-provided résumé for a particular candidate); in such exemplary embodiments, the data-point matrix may already exist in some form and may be updated rather than created.

Figure 4:
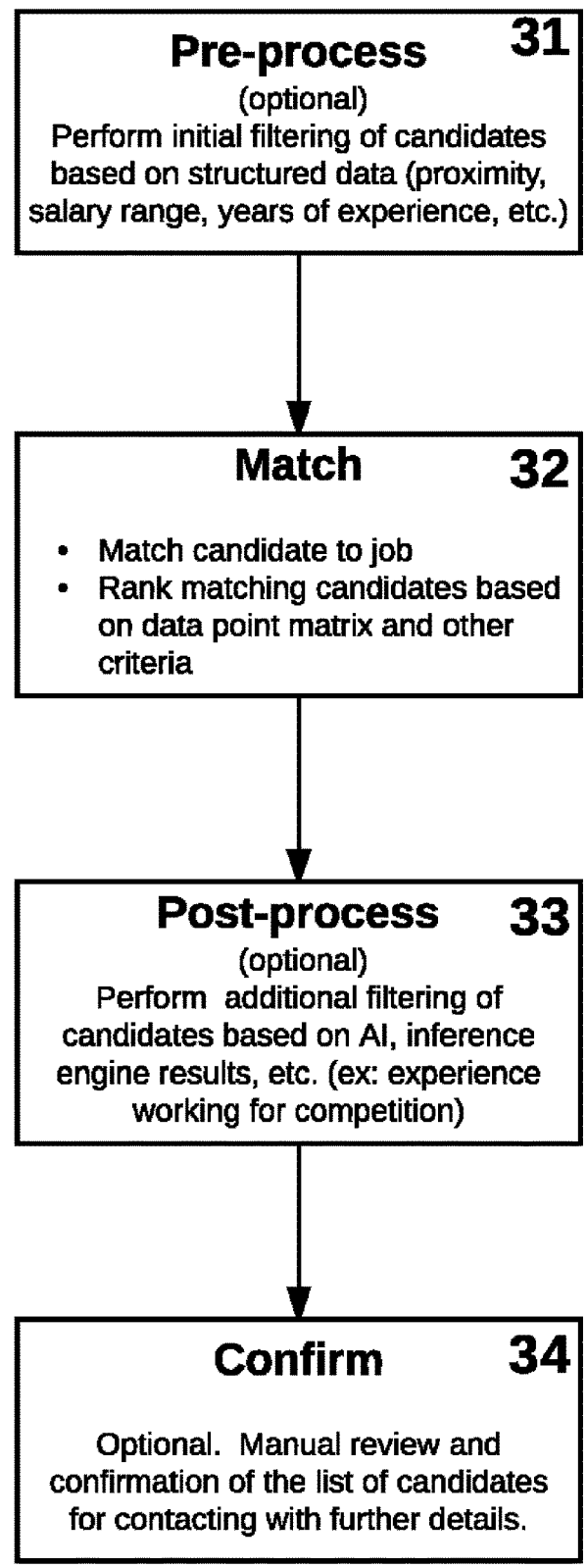
FIG. 4 is an exemplary embodiment of a flowchart depicting a method of performing a matching step.

Turning now to exemplary FIG. 4, FIG. 4 displays an exemplary embodiment of a matching step 3. In a matching step 3, the system may attempt to match job candidates to jobs. This step may include, for example, a pre-processing step 31, a core matching step 32, a post-processing step 33, and a confirmation step 34. In an exemplary embodiment, each of the steps apart from the core matching step may be optional; for example, in some exemplary embodiments, these steps may be enabled or disabled based on the candidate search to be performed, or may be enabled or disabled for a particular system. Further, in an exemplary embodiment, the criteria used by each of the pre-processing step 31, core matching step 32, post-processing step 33, and confirmation step 34 may be weighed in order to ensure the best possible matches, and may be dynamically adjusted (in terms of weight and in terms of which criteria are actually applied) in order to loosen or tighten the focus of a search.

In an exemplary embodiment, a matching method 3 may be triggered following a sourcing step 2. However, in an exemplary embodiment, matching 3 may be a continuous process, which happens alongside a sourcing step 2, such that matching 3 is performed on newly sourced résumés as they are sourced. For example, according to an exemplary embodiment, a matching step 3 may be triggered by the addition of a new résumé by a user of a jobs board or other source location, an updated résumé being provided by the user of a jobs board or other source location, the addition of a new job on a jobs board or other source location (such as, for example, via email or by the use of an Applicant Tracking System (ATS)) by an employer, an update to a job description being provided on a jobs board or other source location by an employer, or any other addition or alteration to a résumé or a job description on a jobs board or other source location. In some exemplary embodiments, a matching step 3 may also be performed again if a review step 7 is reached and the hiring manager rejects some or all of the candidates that have been provided to the hiring manager; for example, according to an exemplary embodiment, matching 3 may be performed when a rejection is received, or may be performed when feedback is received from the hiring manager (for example, one or more reasons as to why a candidate was rejected for an interview), which may be done in order to encourage the hiring manager to provide feedback. Finally, in an exemplary embodiment, matching 3 may be triggered before a sourcing step 2; for example, according to an exemplary embodiment, existing candidates having existing candidate profiles stored in a database may be matched 3 before other candidates are sourced in a sourcing step 2. In some exemplary embodiments, a system may be configured to perform matching 3 either before, during, or after sourcing 2; for example, in an exemplary embodiment, a system may assemble a database of candidates for a first position by performing sourcing 2 and then matching 3, and may then match 3 the same database of candidates to a similar second position before performing additional sourcing 2. A system may likewise perform matching 3 for a particular position before, during, and/or after sourcing 2; for example, according to an exemplary embodiment, a new position to be filled may be provided by a hiring manager, and a matching 3 process may begin immediately using the existing candidate profiles stored in the database. Sourcing 2 may then be performed, and as new resumes come in (from sourcing 2 for this position or sourcing 2 for another similar or related position) the matching 3 process may run again on these candidates. (Likewise, the matching 3 process may run again when updated data is received on existing candidate profiles.)

According to an exemplary embodiment, a system may be configured to automatically receive notifications of a user having added their résumé or having updated their résumé, or a job description being created or edited; for example, such a system may be tied into the operations software of a jobs board or source location. In an exemplary embodiment, a system may be configured to automatically perform searches for users having added a résumé or edited a résumé, or employers having added or edited a job description. In an exemplary embodiment, a system may exhibit different behaviors for users who are part of active campaigns (i.e. users who are considered to be candidates for at least one job) and users who are not; for example, in an exemplary embodiment, users who have been identified as being candidates may be monitored more closely, if desired.

In an exemplary embodiment, the conversion of résumé data and job description data into data point matrices, or data sets (such as data vectors) on a data point matrix, may be used to store both all of the data entities contained by the system and all of the relationships between the data entities contained by the system. This may allow all résumés to be cross-referenced with all job descriptions (or may allow a substantial number of résumés to be cross-referenced with a substantial number of job descriptions) with relative ease. As such, in the event that the system fails to match a specific résumé to a specific job, it may be able to repeat a matching step 3 in order to match and suggest other job opportunities that may better suit the candidate, and may be able to repeat a matching step 3 in order to suggest a given candidate to hiring managers having other open positions to the one being presently matched.

In a pre-processing step 31, the system may perform initial filtering of candidates based on some criteria. This criteria may include, for example, any or all types of available structured data, such as proximity, salary range, years of experience (such as, for example, years of experience in general or years of experience with a specific skill), or any other available data. For example, it may be desired to, as part of a pre-processing step, sort out all candidates who are not within a 50-mile radius (or within an estimated 1-hour drive) of a job site. In another example, it may be desired to filter out all candidates having a salary known to be in excess or significantly in excess than a salary of a position being offered (or who can be estimated to have a salary in excess of the position being offered based on their job title).

The system may then perform a core matching step 32, in which the system may attempt to match candidates to jobs. In an exemplary embodiment, the system may perform a search for candidates using a semantic matching engine; in an alternative embodiment, the system may perform a search for candidates using any other searching method or searching tool, instead of or in addition to a semantic engine. The semantic engine may be a natural language processor capable of inferring meaning relevant to a particular subject from literal statements in a quasi-analog manner, often by analyzing the context of a literal statement and how the statement relates to other words or statements. The semantic engine may be or may include an artificial intelligence (AI), machine learning software, natural language processing software, or comparable software or hardware, such as may be desired. The résumés of searched candidates may be scored based on their match to one or more elements extracted from the job description, which may include one or more key points, concepts, or requirements that are outlined in the job description.

According to an exemplary embodiment, as part of the matching step 32, the résumé of a candidate may be matched to more than one job. For example, in an exemplary embodiment, a data point matrix may include multiple data sets, such as data vectors, which each represent the requirements of a job. This may mean that, even if the system fails to match the candidate to one particular job, the system may be able to match the candidate to a different job based on the data set of the second job and its similarity to the data point matrix of the résumé.

In an exemplary embodiment, as part of the matching step 32, searching (using a semantic engine or otherwise) may be performed on those résumés sourced for the job in question. In another exemplary embodiment, searching may be performed on all candidate résumés that exist in the system, with résumés that have been sourced specifically for the job in question being given a higher priority in the search, if desired. In another exemplary embodiment, searching may by default consider all résumés, but may exclude résumés in cases where the candidate associated with the résumé has selected an option to strictly associate the résumé with a particular job (for example, if the candidate has selected an option not to be considered for other jobs). In another exemplary embodiment, searching may by default consider only those résumés sourced for the job in question, but may include résumés in cases where the candidate associated with the résumé has selected an option to allow the consideration of the résumé for any applicable job or for a broader set of applicable jobs.

In an exemplary embodiment, résumés may be scored by a semantic engine utilizing machine learning concepts. The semantic engine may apply weight to certain requirements, which may be specified by a hiring organization or recruiter or may be derived from the job description. For example, these requirements may include (but may not be limited to) a title search (i.e. a search of job titles), the date on which the résumé was last updated, particular skills (or synonyms of those skills) that may be listed in the résumé, a number of required years of experience in a particular field, a number of required years of experience in a particular industry, a number of years of experience associated with a skill or with a particular set of skills, employment continuity, salary history, salary requirements, geographical proximity, social footprint (for example, the connections of the user on one or more social media websites), activity of social media (for example, the postings of the user on one or more social media websites), willingness to relocate, and any additional requirements that have been provided by the hiring company or which have been deemed relevant to the process. In an exemplary embodiment, some or all of these criteria may be given different levels of weights from one another. In an exemplary embodiment, particular criteria may be mutually exclusively given weight, or may weigh against each other; for example, if a candidate is found who is geographically proximate to a hiring company, it may not matter that the candidate is willing to relocate, and the willingness of the candidate to relocate may not be scored or may be given different weight.

The semantic engine may then determine which candidates have the highest scores, and may select candidates accordingly. For example, in an exemplary embodiment, a semantic engine may rank candidates based on the data point matrix scores of the candidates in each of the above areas (or in each of the above areas that are actually considered) and based on any other criteria, as desired. The semantic engine may then use the ranked list of candidates to select one or more candidates to progress to a next stage of hiring; for example, in an exemplary embodiment, the semantic engine may take the top X most highly ranked candidates.

In an exemplary embodiment, to facilitate searching (using a sematic engine or otherwise) during a matching step 32, the search functionality of the system may be configured to be iterative in nature and may broaden with subsequent iterations, similar to the automatic sourcing search 211 performed in the previous step 2. For example, in an exemplary embodiment, if the system performs a search for candidates that score above a pre-set primary threshold, and is unable to identify a particular prerequisite number of candidates for the position which score above that threshold, the system may perform a new search with looser search criteria, such as a pre-set secondary threshold or an automatically calculated secondary threshold. In an exemplary embodiment, the system may be configured to continue this until the prerequisite number is identified; in another exemplary embodiment, the system may terminate the searches after a specified number of times or after reaching a specific threshold.

In an exemplary embodiment, the system may be configured to loosen or deprioritize particular search criteria first. For example, according to an exemplary embodiment, the system may be configured to first loosen search criteria based on the considerations of geographical proximity, skill set, years of experience, salary requirements, or any other specifications that might be provided by the hiring company. In an exemplary embodiment, loosening of search criteria may be performed in pre-configured steps (i.e. using a pre-set secondary threshold); for example, if a search is initially performed of candidates within a 20-mile radius, the next pre-set secondary threshold may be candidates within a 50-mile radius, and the one after that may be candidates within a 100-mile radius.

In an exemplary embodiment, candidates may be grouped into a first group, a second group, or any number of other groups based on the relevance of the candidates to the job description, which may be determined by the search results. For example, according to an exemplary embodiment, candidates meeting a primary score threshold may be grouped into a first group, candidates meeting a secondary score threshold but not a primary score threshold may be grouped into a second group, and so on and so forth.

According to an exemplary embodiment, a post-processing step 33 may be performed in order to perform additional filtering of candidates that have been selected as part of a matching step 32. In some exemplary embodiments, a post-processing step 33 may perform filtering by the use of an AI, by the use of inference engine results, and so forth. In some exemplary embodiments, a post-processing step 33 may filter based on any criteria, including criteria that have been considered previously or new criteria used only in post-processing filtering.

In an exemplary embodiment, an optional post-processing step 33 may filter candidates based on positive criteria that positively distinguishes the candidate seeking employment over other candidates, negative criteria that is detrimental to the candidate seeking employment, neutral criteria, or criteria that can be or is more than one of the above. For example, in an exemplary embodiment, a candidate may be filtered based on the candidate's experience working for a firm that competes with the firm that has the job opening. This may be considered to be a positive criterion (the candidate may have insight into the workings of the competitor) and the candidate may be filtered for that reason; conversely, it may be considered to be a negative criterion (the candidate may be subject to an undesirable post-employment agreement with the competitor) and the candidate may be filtered for that reason. In some exemplary embodiments, a post-processing step 33 may remove filtered candidates or may change the group into which a filtered candidate may be placed, as may be desired.

Lastly, according to an exemplary embodiment, an optional confirmation step 34 of a matching step 3 may be performed after a post-processing step 33 or after a matching step 32 if a post-processing step is not performed. In a confirmation step 34, depending on the configuration of the system, a final list of matching candidates may be provided by the system, for example to a recruiter and/or to the hiring company, in order to permit manual review and confirmation of the final list by either or both of the recruiter and the hiring company. In an exemplary embodiment, this step may take place prior to initiating contact with the candidates. In an exemplary embodiment, the system may be configured to automatically initiate contact with the candidates once they have been identified, but may not receive authorization to do so until the confirmation step 34 is completed.

Figure 5:
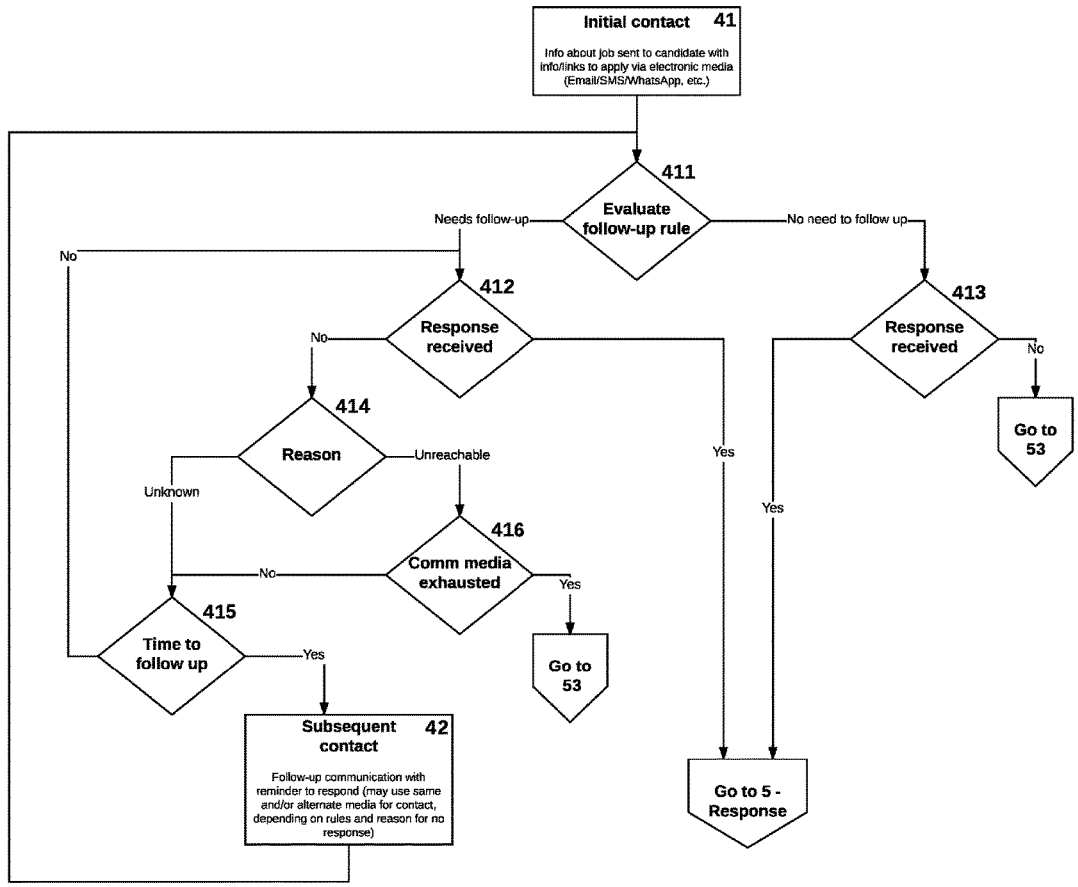
FIG. 5 is an exemplary embodiment of a flowchart depicting a method of performing a contact step.

According to an exemplary embodiment, after a confirmation step 34 is completed (if it is desired to perform one) or after the matching step 3 is completed, the system may perform a contact step 4. This may be shown in, for example, exemplary FIG. 5. According to exemplary FIG. 5, in a matching step 4, the system may automatically initiate a communication campaign to the one or more candidates identified by the search.

The system may first perform an initial contact step 41, in which information about the job is sent to a candidate, along with a link enabling the candidate to apply for the job, via some form of electronic media or otherwise. After an initial contact 41 has been sent, the system may then evaluate a follow-up rule 411, in order to determine whether the system has a need to follow up on the initial contact. For example, according to an exemplary embodiment, the system may determine that it has a need to perform additional follow-up communications if the candidate is a high-priority candidate who appears to be particularly suited for a position, if there are few other candidates being considered for the position, or if the system has otherwise been instructed to perform follow-up via a follow-up rule 411. In an exemplary embodiment, the system may determine that it does not have a need to perform additional follow-up communications if the candidate is a lower-priority candidate or if the system has otherwise been instructed not to perform follow-up via a follow-up rule.

If there is no need for a follow-up communication established by a follow-up rule 411, then the system may determine whether a response has been received 413. This may be done, for example, periodically, when every new communication is received, or otherwise, as may be desired. If a response is received, the system may proceed to step 5, a response step, which may be indicated in exemplary FIG. 6. If no response is received and some criteria is met (for example, if no response has been received for a designated period of time, or if no response is received by the time a certain number of other candidates have responded, or if no response has been received for a certain period of time after at least one other candidate has responded, or otherwise, as may be desired) the system may proceed to a step of removing the candidate 53.

If there is a need for follow-up communication established by a follow-up rule 411, then the system may likewise determine whether a response has been received 413. This may be done for example, periodically, when every new communication is received, or otherwise, as may be desired, using similar logic to the "no need for follow-up communication" case or using different logic (for example, the "need for follow-up communication" case may use a shorter time period, if desired). If a response is received, the system may likewise proceed to step 5.

However, if no response is received, then the system may consider whether executing a follow-up response is necessary. In a first step, when no response has been received, the system may attempt to determine the reason as to why no response has been received 414. For example, the system may be configured to determine whether no response has been received for the reason 414 that the candidate is unreachable by the candidate's posted contact information; for example, an attempt to make a phone call to the candidate may result in a message that the call cannot be completed as dialed, an attempt to send an email communication to the candidate may result in a bounce message, or an attempt to send a physical letter to the candidate may result in a "return to sender" notification. In such a case, when the communication media that is accessible to the system has been exhausted 416 and it does not appear that the candidate has been successfully contacted, the candidate may be removed from consideration 53. However, if other communication media are identified that have not been exhausted, the candidate may be contacted by said communication media.

The system may also conclude that it is not able to identify a specific reason as to why the candidate has not responded 414. In such a case, the system may determine that a follow-up communication should be drafted 415. According to an exemplary embodiment, upon making such a determination, the system may initiate a subsequent contact 42. In some exemplary embodiments, the subsequent contact 42 may be a follow-up communication that indicates its status as a follow-up communication, and provides a reminder to respond. The system may make use of the same media initially used to make contact or may make use of alternate media to make contact, such as may be desired; this may be based on, for example, the rules of the system, the reason for no response if one can be determined, the candidate's expressed preferences if any have been expressed (for example, the candidate's profile on a job search website may indicate a preference to be contacted by email) or any other logic such as may be desired. In an exemplary embodiment, the messages that may be sent may be tailored to the communications medium used to send the messages; for example, according to an embodiment where a text message and an email are sent to a candidate simultaneously, a text message communication may be a short message containing only essential details (or may even be a notification that an email was sent) and an email communication may be a more detailed communication, as may be desired. Messages sent via the same or or a different communications medium may be sent sequentially or simultaneously, as may be desired.

Once a follow-up communication has been sent in a subsequent contact step 42, the system may proceed back to near the start of the method 4. For example, the system may then be configured to determine whether future follow-up is necessary based on a follow-up rule 411; for example, in some cases, it may be desirable to send only one follow-up communication to a candidate, whereas in other cases it may be desirable to send more than one follow-up communication to a candidate.

The system may perform similar steps for every candidate or for more than one candidate, and may proceed through a list of candidates in some order. For example, in an exemplary embodiment, the system may proceed by residency group affiliation or otherwise may proceed by rank; for example, in an exemplary embodiment, a system may contact candidates who scored above the primary score threshold first (in any order) and may contact candidates who scored above the secondary score threshold next (in any order). In another exemplary embodiment, the system may proceed in any order.

According to an exemplary embodiment, the system may, as part of the communication campaign, send a variety of types of information to candidates. This information may include, for example, periodic updates about the status of their application to the position, reminders about what next steps the candidate needs to take or reminders about future appointments (or any other applicable reminders), requests for further information from the candidate, or any other communications, as may be desired.

In an exemplary embodiment, the system may make use of one or more varieties of channels of communication, which may be used on their own or in any combination. These may include (but may not be limited to) a Web portal, email, a telephone (including, for example, mobile, landline, and SIP phones), fax/facsimile, SMS text messaging, social media posts or notifications, push notifications, device-based messaging such as VIBER, FACEBOOK MESSENGER or WHATSAPP, or any other method of communication.

According to an exemplary embodiment, the system may be configured to treat each campaign directed at a particular candidate as containing a single thread of communication with the candidate, regardless of whether the same communications medium or a different communications medium has been used in order to contact the candidate in the past. For example, according to an exemplary embodiment, a particular candidate may be initially contacted by telephone, may be sent a follow-up message via email, and may be engaged in subsequent dialogue via SMS text messaging; each of these communications may be combined into a single thread of communications for the candidate, with the system being able to draw on previous communications with the candidate from each of these different sources.

According to an exemplary embodiment, the system, in the contact step 4 and during the execution of the communication campaign, may begin a communication campaign by notifying the candidates of the job opening that matches their résumé, and providing instructions for applying for the position. In another exemplary embodiment, the communication campaign may begin at a later step, if, for example, the candidate already has an application on file for the position or for a similar position, or if the candidate has already expressed an intent to apply.

In an exemplary embodiment, the system may use the rank or relevancy group affiliation of a candidate to determine information other than the order in which candidates should be contacted. For example, according to an exemplary embodiment, the nature of the communication may be dependent on the relevancy group that the candidate is in; for example, a candidate might be "strongly encouraged" to apply for a position to which their résumé is highly relevant (i.e. the candidate has a high relevance score) while the candidate might be provided with the position in a list of potentially interesting positions if their résumé is less relevant (i.e. the candidate has a lower relevance score). The frequency of communication with a particular candidate, the content of the communications, and the choice of communication channels used may also depend on the relevance score of the candidate. In an exemplary embodiment, the system may dynamically adapt the nature of communication, frequency, content, and choice of communication channels based on the progress of bi-directional communication with the candidate; for example, a candidate may be initially contacted by e-mail, and then may be sent an SMS text message or may be called (for example, by an automated calling system) in a later stage in order to set up an interview time (or if the candidate expresses a preference for being contacted by telephone, or if they do not respond to the e-mail within a particular amount of time).

In an exemplary embodiment, the system may continue to perform a communication campaign with a candidate until one of the following conditions is met. First, the communication campaign may stop if the candidate is hired for the position. Second, the communication campaign may stop if the candidate elects to stop receiving further information about the job opening. Third, the communication campaign may stop if the system has been unsuccessful in contacting the candidate; for example, if the candidate has provided an email address and a phone number, and does not respond to communications with either the email address or the phone number, the communication campaign may stop after a certain number of communications have been made. The communication campaign may also stop if a "bounce notice" or other indication of a failed communication is received; for example, if an email receives a hard bounce, or if a notification is provided that an SMS text message did not go through due to having a bad number (or due to the candidate providing a landline number instead of a cell number). Finally, the communication campaign may stop if the position is filled, cancelled, or closed, with the system optionally providing notice of this in a final communication to the candidate. The communication campaign may be affected based on the candidate's response, for example the candidate's open or click rate for messages sent by some form of electronic communication, including but not limited to email, SMS, text chats, social media, or some other method, or the call status of communications with the candidate, or other such responses, if desired.

In an exemplary embodiment, the system may be configured to make use of a semi-automated predictive dialer system for initiating phone calls to one or more candidates. According to an exemplary embodiment, the dialer system may initiate calls to a list of candidates, which may be performed sequentially in some order or may be performed according to other logic, as desired. The dialer system may then determine whether the call has been successfully completed and whether the party at the other end of the line is a live person. When the dialer system determines that the party on the other end of the line is a live person, the dialer system may bridge the call to a recruiter, who may then complete the conversation with the candidate. On the other hand, when the dialer system determines that it has not connected to a live person at the other end of the line (for example, if a voicemail service or answering machine is reached) the dialer system may be configured to leave a message, terminate the call, and move on to the next candidate on its list. In some embodiments, some amount of calls may be performed simultaneously rather than sequentially; for example, the dialer system may be paired with more than one recruiter, and may attempt simultaneous or overlapping calls until all recruiters are in a conversation with a candidate.

Figure 6:
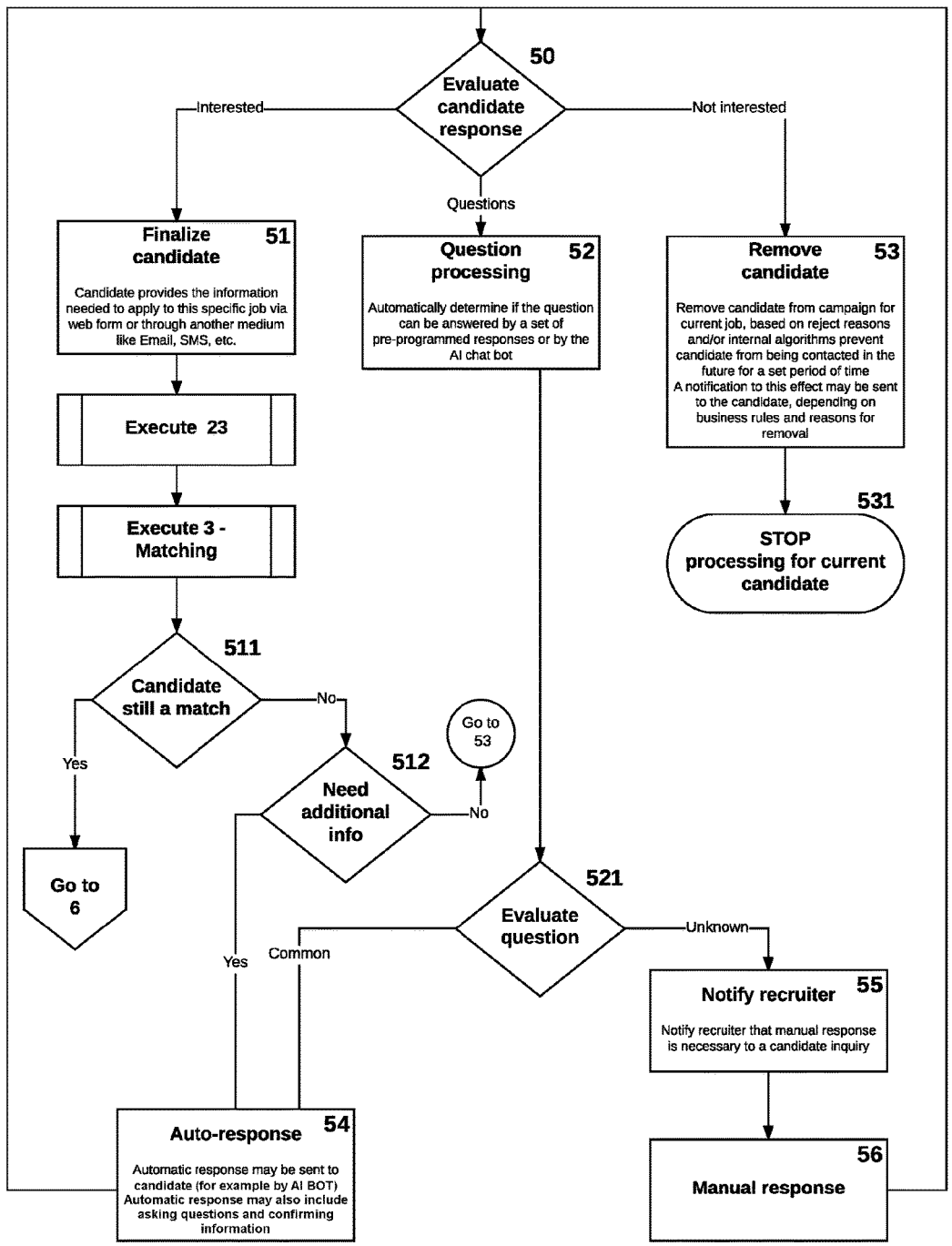
FIG. 6 is an exemplary embodiment of a flowchart depicting a method of performing a response step.

Turning now to exemplary FIG. 6, FIG. 6 displays an exemplary embodiment of a flowchart depicting a method of performing a response step 5. In an exemplary embodiment, a communication campaign system may be configured to be bi-directional, such that it can respond to questions and requests for information posed by one or more of the candidates under consideration.

When a candidate has been contacted by some communication channel, and when the candidate responds by some communication channel (which may or may not be the same communication channel as was used to initially contact the candidate, if desired; for example, the candidate may initially be contacted by email and may elect to respond to the contact by calling a telephone number provided in the email) the system may be configured to handle and respond to the candidate's response 50. For example, in an exemplary embodiment, the system may determine from the candidate's response (for example, by parsing an email of the candidate, or otherwise analyzing their response) whether the candidate has responded to the initial contact message provided by the system by accepting an offer provided in the contact message (such as, for example, an offer to apply for a position), by rejecting an offer provided in the contact message (for example, by sending a message declining an offer to apply for a position), or by asking a question or requesting more information.

If the response of the candidate is to indicate interest in a position or an offer, the system may be configured to take action to finalize the candidate 51. In an exemplary embodiment, should the system receive a communication from the candidate indicating that the candidate is interested in the position, the system may send a request for any other remaining required information to the candidate. According to an exemplary embodiment, if interested in the job, the candidate may click on a link provided by the system and may then provide the remaining required information or other information that may be necessary or useful to a hiring decision.

According to an exemplary embodiment, the candidate may be taken to a page containing all of the information that they have already provided, as well as all of the information that is necessary, optional, or requested; on the page, the information that the candidate has already provided or which is otherwise available may be pre-filled, while the other sections of the page may be left blank. In an exemplary embodiment, the candidate may thus be provided with an opportunity to update any or all of the information that they have previously provided, or may be provided with an opportunity to correct erroneous information that has been taken from elsewhere. For example, in an exemplary embodiment, the candidate may be provided with the opportunity to update their résumé, their contact details, their salary requirements, or any other information. Candidates may also be provided with the opportunity to expand upon information that they have provided or which has been retrieved from a candidate profile or elsewhere. For example, a candidate may be able to optionally provide information on the key skills for the position, such as the numbers of years of experience typically required for the position, the last year the candidate used those skills, and/or a description of how the skill was last used. (According to another exemplary embodiment, rather than being directed to a web site and solicited for the additional information via a web form, the candidate may instead be solicited for the additional information through another medium, such as email, SMS, or another such medium as may be desired.)

In some exemplary embodiments, additional screening questions may be added during this step. For example, according to an exemplary embodiment, a candidate may add a new skill or new work experience to a web form when they are directed to it, indicating that the candidate has developed a new skill or new work experience; the candidate may then be further screened based on this new skill or new position, and may, for example, be asked further questions about the new skill or work experience.

In an exemplary embodiment, once a step of finalizing the candidate 51 has been completed, the system may perform a step of loading the candidate's information 23. The step of loading the candidate's information may be similar to, or may use the same logic as, the step of loading and parsing the candidate's résumé information previously executed in method step 2. If the candidate has provided additional information, for example if the candidate has provided additional information other than as a direct response to a question of a web form, this additional information may be parsed. For example, if the candidate has provided additional information in the form of a response to an open-ended question or has provided an email or SMS response rather than a web form response (or has sent a communication via any other communications medium, such as via a telephone call) this information may be parsed and populated in the database. The structured data may then be populated into the data point matrix previously used for the candidate (or, in some circumstances, into a new data point matrix) in order to update the candidate's data point matrix. This may ensure that the candidate's information is completely up to date, and that, if it has been a significant period of time since the candidate's résumé was initially received and the candidate has accumulated new skills or work experience, that the candidate's new skills or work experience (or other changes to their résumé) are adequately reflected in the data-point matrix.

Once a step of loading information 23 has been performed, the system may perform a step of matching the candidate to one or more positions, which may be done using the matching method of step 3 or may be done using another matching method. The matching method may include a core substep of matching 32, in which the candidate is matched to a job based on the data point matrix and other criteria, and may include one or more other optional steps such as a post-processing step. For example, when the candidate has provided additional information, the candidate's additional information may be filtered based on one or more items of interest for a pre-processing step, such as the candidate's experience working for a competitor; if the candidate's responses indicate that they now have experience working for a competitor when they did not have such experience before, then the candidate may be filtered based on that new experience.

In an exemplary embodiment, a matching method 3 may be triggered by the addition of a new résumé by the candidate to a source location (such as a jobs board) or by updates to a résumé being provided by the candidate to the source location. In some exemplary embodiments, the system may automatically receive notifications of the candidate having updated their résumé; in other exemplary embodiments, the system may be configured to periodically search for candidates that are already part of the campaign, or which otherwise have already been searched, in order to determine if they have recently updated a résumé.

Likewise, in some exemplary embodiments, a matching method 3 may be triggered by the addition of a new job description or changes being made to an existing job description. For example, in the event that a job description is changed, a candidate that has not made any changes to their résumé and who is considered to be relevant to the original job description may still need to be evaluated in order to determine whether or not the candidate matches the new job description.

Following a matching step 3, it may be determined whether the candidate is still a match for the position 511 based on the new information that the candidate has provided. For example, in one exemplary embodiment, a matching step 3 may be configured to filter out candidates who have worked for a competitor, based on the expectation that those candidates may be subject to a non-compete agreement or other burdensome employment agreement. A candidate may provide new information indicating that they are now working for a competitor, indicating that they now may be subject to being filtered out when they would not have been filtered out based on their previous disclosure. (Alternatively, a candidate may indicate that they have moved away from the general vicinity of a position, or may indicate that they have recently accepted a higher-paying position, or may otherwise indicate their unsuitability as a match.)

If it is determined, based on the candidate's new disclosure, that the candidate is still suitable as a match 511, then the system may proceed to a submission step 6, which may be depicted in FIG. 1. For example, in a submission step 6, the candidate may be added to a curated list of candidates for submission to a hiring manager, or may be submitted to the recruiter for manual approval and addition to a curated list of candidates for submission to a hiring manager, as may be desired.

However, if it is determined, based on the candidate's new disclosure, that they are no longer suitable as a match 511, or if it is determined that there is some uncertainty as to whether the candidate is suitable as a match 511, the system may attempt to resolve the uncertainty, and may determine that it needs additional information and what information it needs 512. If it is determined that the candidate is unsuitable based on what they have disclosed, the system may proceed to a removal step 53. However, if it is unclear whether the candidate is suitable or not, then an auto-response 54 may be generated and may be sent to the candidate requesting more information.

If the response of the candidate is to express disinterest in or reject an opportunity, the system may be configured to take action to remove the candidate from consideration 53. According to an exemplary embodiment, the system may take action to remove the candidate from a campaign for a current job, and may take action to ensure that the candidate is not communicated with again about the current job, or is not communicated with again about the current job for at least a period of time (which may, for example, be preselected or may be selected by the candidate). According to another exemplary embodiment, the candidate may be excluded from other communication (such as communication about other related jobs), or even all communication, for a set, unlimited, or indeterminate period of time (for example, until the candidate re-initiates contact or logs back into a service) not just from communication related to a particular job. However, in some exemplary embodiments, a notification communication may be sent to the candidate indicating that they will be excluded from other communications in the future, if this is desired. The system may then stop the processing for the current candidate 531.

In an exemplary embodiment, the system may be configured to consider the candidate's reasons for rejecting the offer, should any be provided. The system may also be configured to attempt to automatically determine a candidate's reasons for rejecting an offer if no reason is provided. In some embodiments, the candidate's reasons for rejecting the offer may be provided to the recruiter or the hiring manager (which may allow for improvement of the recruitment process, the job description, or any other areas that may be improved). In an exemplary embodiment, the candidate may not be contacted for a period of time that is based on the rejection reasons, or may be derived from the rejection or rejection reasons by an internal algorithm. For example, if the candidate rejects the opportunity based on "too many communications" or "too many irrelevant communications," the period of time in which the candidate may not be contacted may be lower and may be imposed merely so that the candidate is not harassed by a high volume of communications, whereas if the candidate rejects the opportunity based on no longer being interested in employment in a certain field, the candidate may not be contacted about opportunities in that field for an indefinite period of time. The candidate may also be excluded from being contacted about specific types of offers; for example, according to an exemplary embodiment, the candidate may be marked for exclusion from particular industry segments (whether for a period of time or permanently), may be marked for exclusion from specific job titles or job descriptions, or may be marked for exclusion from any other type of offer based on any other criteria.

Finally, if the response of the candidate is to ask a question about the offer, or to request more information about the offer or anything related to the offer, the system may be configured to execute a question processing step 52. In the question processing step 52, the system may determine whether a question can be answered by a set of pre-programmed responses, and if so provide one of the pre-programmed responses. In an exemplary embodiment, pre-programmed responses may be dynamic rather than static; for example, according to an exemplary embodiment of a question processing step 52, a pre-programmed response may be initially selected having incomplete or placeholder data, and may be customized based on reading information that has been provided as part of a job description or as part of a candidate profile.

If the question cannot be answered by a set of pre-programmed responses, in an exemplary embodiment, the system may determine whether the question can be answered by an AI chat bot. In an exemplary embodiment, an AI bot may be used in addition to the canned question and response sequences of the pre-programmed responses in order to mimic the experience of a human dialogue with the candidate. This may be used for a variety of ends; for example, according to an exemplary embodiment, a conversational AI bot may be used in order to correct the candidate's misconceptions and provide arguments intended to change the candidate's mind if it appears the candidate is considering rejecting an offer for a particular position, or even if the candidate has already rejected an offer for a particular position but appears to have done so (or even potentially may have done so) based on a misconception or misunderstanding. In an exemplary embodiment, a conversational AI bot may be provided that includes some degree of learning behavior, such that the AI bot can be self-teaching over the course of a communications campaign with a particular candidate or over the course of many communications campaigns with many different candidates.

If neither the pre-programmed responses nor the AI chat bot is able to resolve a question of the candidate, then, according to an exemplary embodiment, the system may take other action. For example, according to an exemplary embodiment, the system may be configured to evaluate the question 521, provide an automatic response to the candidate 54 if one can be provided, and notify the recruiter if an automatic response cannot be provided and a manual response is necessary for a candidate inquiry 55. The recruiter may then provide a manual response 56.

In an exemplary embodiment, the system may include a common question and answer database. According to the exemplary embodiment, when a candidate asks a question that exists in the common question and answer database, or requests information that can be found in the form of an answer in the common question and answer database, the system may be configured to answer the question automatically. According to an exemplary embodiment, the system may be configured to automatically maintain and update this common question and answer database; for example, according to an exemplary embodiment, the system may include a self-teaching algorithm (such as a machine learning algorithm or AI) in order to improve the quality of the automated responses and expand the list of common questions and answers stored in the common question and answer database.

According to an exemplary embodiment, a self-teaching algorithm, such as an AI program, may go beyond improving the quality of automated responses, and may, if desired, proactively ask questions to one or more candidates. In an exemplary embodiment, this behavior may be performed as part of an automatic response step 54; for example, according to an exemplary embodiment, an AI bot or other self-teaching algorithm may be used to not only send automatic responses to candidates, but may also be used to proactively ask questions to candidates and confirm any candidate information that needs to be confirmed, such as may be desired. In an exemplary embodiment, the AI program may determine questions to ask to the candidate based on reading and interpreting the candidate profile, and may be configured to automatically submit these questions to the candidate. In some exemplary embodiments, this task may be performed completely automatically such that a reviewer is not needed for any step of the process; in other exemplary embodiments, it may instead be desired to submit one or more of the questions to a reviewer, such as a recruiter or hiring manager, for review before they are submitted. This may ensure that the role of the recruiter can be minimized after a candidate is sourced, as the recruiter will not need to devote any effort (or will at the very least need to devote substantially less effort) to asking questions, confirming information, and updating the database.

In an exemplary embodiment, a self-teaching algorithm, such as AI software, may be configured to look up any data that may be on file for a particular candidate or which otherwise may be available for a particular candidate. For example, according to an exemplary embodiment, an AI may be configured to look up a social media profile of a candidate in order to confirm details provided by the candidate, or in order to better craft specific questions about the candidate's experience.

For example, according to an exemplary embodiment, the self-teaching algorithm may read the work history of the candidate, and may determine that the candidate, Venkat, has worked with Jenkins-based automation servers at a previous place of work, Cerner Corporation. The self-teaching algorithm may then generate a question such as, "Venkat—I see that you have worked with Jenkins deployment automation at Cerner. How many years did you work with Jenkins? And can you tell me a bit more about your experience with it?"

In some exemplary embodiments, the self-teaching algorithm may be configured to make inferences based on available information, or to seek out information that may be useful to develop other questions. For example, in an exemplary embodiment, the work history of the candidate may show previous work at Cerner, and the candidate may state that they have experience with Jenkins. The self-teaching algorithm may then generate a question such as "Venkat—I see that you have experience with Jenkins deployment information. Was that at Cerner?" and may then ask the above question when it is confirmed that the candidate did gain this experience at Cerner.

In an exemplary embodiment, the self-teaching algorithm may be configured to ask a question multiple times if it does not receive a response. The self-teaching algorithm may alternatively be configured to inquire about another skill or otherwise move onto the next question if it does not receive a response; in some exemplary embodiments, it may be configured to move on immediately, may be configured to ask the question a set number of times before moving on, or otherwise may be configured as desired.

When the self-teaching algorithm receives a response, it may be configured to automatically update a candidate profile record. The self-teaching algorithm may further be configured to reevaluate the candidate, for example periodically or after each response; in an exemplary embodiment, based on the candidate's responses to questions, the self-teaching algorithm may be configured to reject the candidate and opt the candidate out of the campaign, and may further be configured to inform the candidate of this. For example, in an exemplary embodiment, a self-teaching algorithm may be configured to inform the candidate that the experience they have does not align with the job, that the recruiter's files have been updated based on the candidate's responses, and that the recruiter will reach out when they identify another job that matches the skills or experience of the candidate or aligns with the answers that the candidate has provided to the questions.

In an exemplary embodiment, the self-teaching algorithm may be configured to ask about inconsistencies or apparent inconsistencies in information that has been provided by the candidate, or about inconsistencies or apparent inconsistencies between information that has been provided by the candidate and the job description. For example, according to an exemplary embodiment, a particular candidate may apply for a job having a requirement of a bachelor's degree in Computer Science, or an equivalent thereof. The candidate may supply a résumé without any completed higher education. This may prompt a conversation similar to the following:

AI BOT: "This job requires a Bachelors in Computer Science. I did not see any education in your résumé. I also looked at your LinkedIN Profile and did not see education listed. Do you have a bachelors' degree?" CANDIDATE: "I am in the process of getting a degree from Dewy. Will that be acceptable?" AI BOT: "That's a great question. I will check with the hiring manager and get back to you. In the mean time I'd like to ask you a few questions about your experience."

In an exemplary embodiment, a self-teaching algorithm may be configured to ask questions about subject matter other than skills, experience, and related matters. For example, according to an exemplary embodiment, the candidate's willingness to relocate for a position may be a key factor in hiring for the position. The self-teaching algorithm may thus be configured to inquire about a candidate's willingness to move, in order to try to develop the candidate's reasons for moving in more detail. For example, according to an exemplary embodiment, an AI BOT may proactively ask a candidate "Can you tell me a bit more about why you are looking to make a move now?" The AI BOT may then develop one or more responses based on the candidate's response.

In an exemplary embodiment, the self-teaching algorithm may make use of a dialogue approach in order to ensure that the candidate has properly understood aspects of the position or has properly communicated their own information. For example, in an exemplary embodiment, a candidate may supply a résumé to a position showing that they live approximately 60 miles from a job location. Under such circumstances, according to an exemplary embodiment, the self-teaching algorithm may proactively ask the candidate about the candidate's current address. Then, if the candidate confirms that their current address is the current address they provided on their résumé and they live 60 miles from the job location, the self-teaching algorithm may be configured to confirm that the candidate understands that the job location is reasonably far away, and may in some circumstances inquire about whether the candidate has any intention of relocating or any willingness to relocate for the position. This may prompt a conversation similar to the following:

AI BOT: "Are you still residing at 101 Main Street, Pittsburgh?" CANDIDATE: "Yes." AI BOT: "Got it. It looks like your commute would be 60 miles and Google Maps says it's about 90 minutes during rush hours. Does that work for you?" CANDIDATE: "I plan to relocate if hired." AI BOT: "Got it."

In an exemplary embodiment, a self-teaching algorithm may also be utilized in order to investigate or explore any specific job requirements that the candidate has articulated. For example, according to an exemplary embodiment, a candidate may be asked to provide a desired proximity or a desired salary range for a position at the same time as the candidate is asked to submit their résumé. In the event that a close match between the candidate and a particular position is found, or in the event that the closest matches between the candidate and a position are positions that fall closely outside of the candidate's requirements, the candidate may be asked about the close match or the closest available matches.

For example, according to an exemplary embodiment, a candidate may be asked about a desired salary range and may provide a desired salary of at least $80,000 per year, or a desired salary range of at least $80-85,000. However, a close match may be found between the candidate and a position that pays slightly less than this minimum salary range but has other benefits; for example, the position may have a good health plan or may allow the candidate to save on travel costs by working from home. This may prompt a conversation similar to the following:

AI BOT: "My file says you are looking to make $80-85 k per year. Are you open to a position that's 100% work from home that pays $70-$75 k?" CANDIDATE: "No, I really need to be at $80-$85 k." AI BOT: "I will check with the hiring manager to see if we can submit you above the range. In the meantime, I'd like to ask you a few questions about your experience."

Once the candidate has had a question or request for information answered, or has submitted requested information to the AI BOT, it may be understood that the candidate may have additional questions or requests for information, and may be understood that the candidate may have to provide an acceptance or rejection. The system may thus restart a response step 5, and may evaluate the next candidate response.

In some exemplary embodiments, the response step 5 may be configured or may be configurable to run multiple times on the same candidate communication. For example, it may be envisioned that a candidate may provide an email response in which they express interest in an opportunity, but ask a number of questions about the company in preparation for an interview. The system may be configured to both finalize the candidate 51 and execute one or more question processing steps 52.

In some exemplary embodiments, the response step 5 may be configured to prioritize one type of responsive action over another in some cases. For example, in some exemplary embodiments, the candidate may reject an opportunity and may provide an explanation for why they did so that is based on a misconception or based on incorrect information. The system may execute a question processing step 52 and may give the candidate the opportunity to reconsider their rejection before removing the candidate 53.

Finally, when any type of candidate response is received, and before, after, or during any action—including the step of finalizing a candidate 51, the step of question processing 52, or the step of removing a candidate 53—the system may be configured to automatically evaluate any information provided by the candidate in their response. The system may then be configured to determine whether the information provided by the candidate should be added to one or more records of the candidate, and may then be configured to update the candidate record or records within the system as appropriate.

Further, during a response step 5, a candidate may be provided with the opportunity to update one or more details not directly related to finalization, such as, for example, their contact information or preferred contact information, or any other relevant information, as may be desired.

In an exemplary embodiment, at any stage of the process, a candidate may be requested, by the system, to provide information in a form that may be more easily parsed by the system. For example, according to an exemplary embodiment, a candidate may be provided with a web form that allows them the option to expand upon or clarify their experience in one or more skills that might be required for a position. This list of skills may be provided at the same time that the job description is input into the system, which may be done manually (e.g. through the provision of a skills list, separate from the job description, by the hiring company) or may be done through parsing of the job description by the system. In an exemplary embodiment, the candidate may be specifically requested to identify the number of years of experience that they have associated with each of the skills in the skills list, the most recent year the skill was used, the positions that the skill was used at, a description of how the skill was used, and/or any other information that may be applicable; alternatively, such identifications may be optional.

Additionally, in some exemplary embodiments, the candidate may be requested to provide (or may optionally be requested to provide) answers to additional qualifying or screening questions, as previously discussed. Such questions may be, for example, clarification questions about the candidate's experience, or may be any other appropriate questions, as may be desired. In some embodiments, these questions may be provided as a part of the process of vetting the candidate for the position, and the candidate may be disqualified from applying for the position based on the answers that the candidate provides, or based on a lack of response or lack of appropriate response from the candidate.

In a next step, which may be a submission step 6 (as shown in FIG. 1), the results of a recruitment campaign may be assembled. According to an exemplary embodiment, once one or more completed and vetted applications have been generated by the system, the completed and vetted applications may be submitted to the recruiter and/or to the hiring manager. In an exemplary embodiment, in a submission step, the completed and vetted applications may be communicated to the recruiter by any of the communication channels previously described, the recruiter may have the option to review the completed and vetted applications and make any necessary changes or take any other necessary steps (such as, for example, requesting more information from the candidate), and the recruiter may then submit the completed and vetted applications to the hiring manager.

Figure 7:
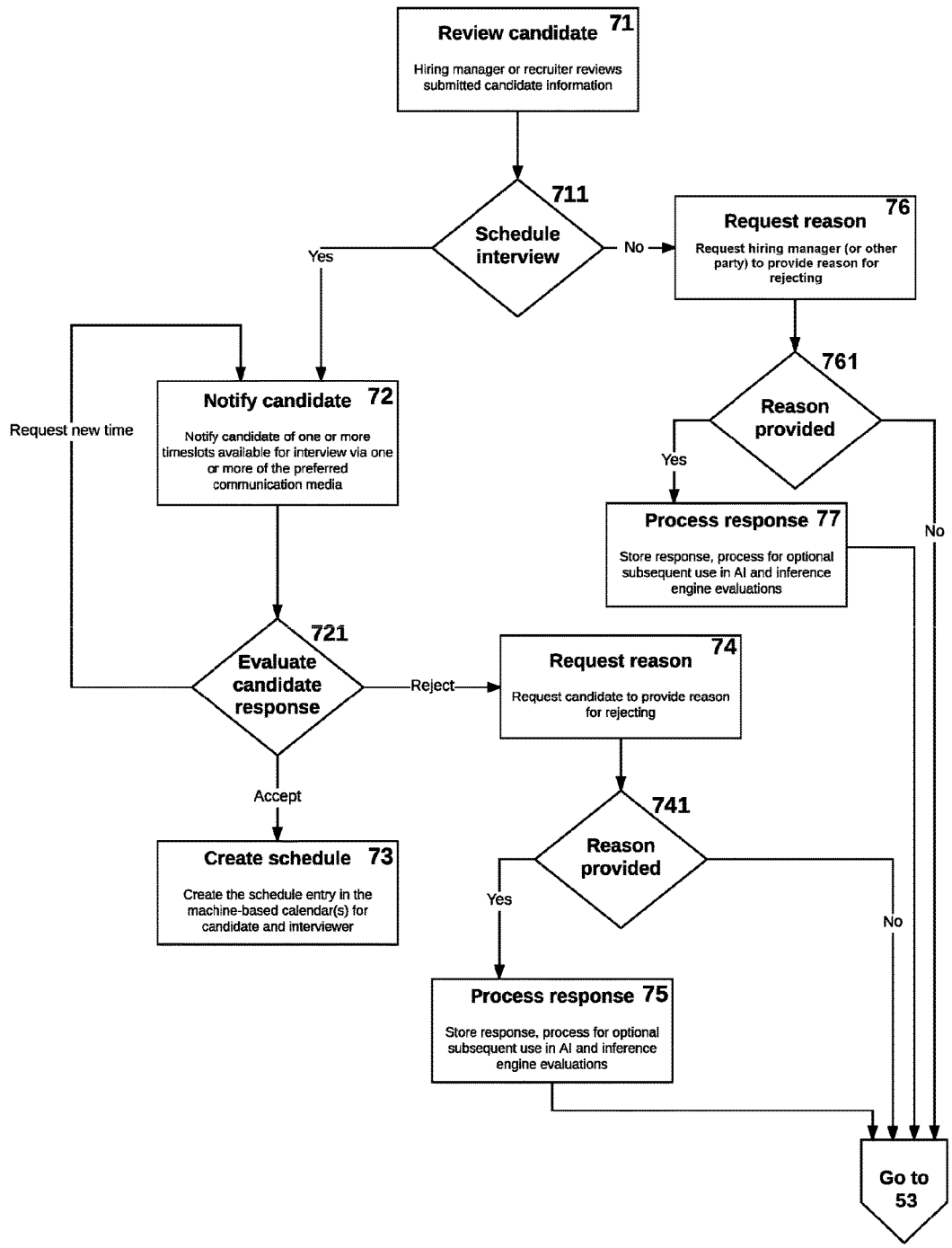
FIG. 7 is an exemplary embodiment of a flowchart depicting a method of performing a review step.

The hiring manager, or any other appropriate party, may then undertake a review step 7. In a review step, a hiring manager may review the completed and vetted applications and make any necessary changes or take any other necessary steps (such as, for example, requesting more information from the candidate) and may then undertake to schedule an interview with the candidate. In an exemplary embodiment, the hiring manager may confirm or deny that the candidate will receive an interview via any of the channels listed above, such as any of the communication channels that may be used by the candidate to apply for the position. In an exemplary embodiment, the hiring manager may specifically make use of the communication channel that the candidate used initially to apply for the position, and may, for example, place a telephone call if the candidate placed a telephone call initially. This may be shown in more detail in exemplary FIG. 7.

According to an exemplary embodiment, in a first part of a review step 7, once a list of candidates has been submitted to a hiring manager, the hiring manager, or another similarly-situated party such as a recruiter, may review the submitted candidate information 71. In an exemplary embodiment, the steps of the method may be performed by the hiring manager or recruiter and therefore there may be no need for an intermediate review process or a submission process 6. However, in other exemplary embodiments, these may be broken up among different parties, as may be desired.

In a next part of a review step 7, it may be determined whether one or more interviews should be scheduled with the candidate 711. If, based on the review of the hiring manager, recruiter, or other similarly-situated party, the candidate warrants an interview, one or more interviews may be arranged with the candidate in order to further evaluate the candidate. According to an exemplary embodiment, if the candidate does not warrant an interview, the candidate may be removed in a removal step 53. However, if the candidate is determined to warrant an interview, one or more schedulable times for an interview may be selected 711.

According to an exemplary embodiment, optionally, if a hiring manager, recruiter, or other similarly-situated party performing manual review determines that the candidate does not warrant an interview and is to be removed in a removal step 53, the system may request a reason 76 as to why the candidate does not warrant an interview or as to what other reasoning the hiring manager or other party used in order to determine that the candidate should be rejected. If the hiring manager or other party provides a reason 761 after one is requested 76, the reason that they used may be stored and processed 77 in order to improve the functionality of the automated system. For example, this response 77 may be used in subsequent evaluations performed by the AI or the inference engine. This response 77 may also trigger a new matching and/or sourcing step, if such is desired.

In some exemplary embodiments, the hiring manager may further clarify the job description before the new matching and sourcing step is triggered, or the new matching and sourcing step may otherwise be based on new information that has been provided by the hiring manager. For example, according to an exemplary embodiment, a hiring manager may reject a submitted candidate and provide the reason of "this candidate does not have enough inside sales experience," or "I am looking for someone with AWS cloud migration experience," or "candidates need to have 5 years of controls engineering using Rockwell," when this information was not mentioned in the job description. This feedback information may be incorporated as new skill requirements when the matching and sourcing step is run again.

Once the response has been processed 77, or if no response is provided by the hiring manager or other party in response to the request 761 (for example, after a set amount of time has passed after an initial request to provide a reason 76 is provided to the hiring manager) the candidate may be removed in a removal step 53. Alternatively, in an exemplary embodiment, the candidate may be removed immediately 53 and the hiring manager or other such party may have a certain time window in which they can provide explanation for this removal.

The candidate may then be notified of one or more timeslots at which an interview may take place 72, via one or more of the preferred communication media that has been used to contact the candidate or via one or more other forms of media. In an exemplary embodiment, a candidate may have more than one option for how the interview can be conducted, and may have different timeslots open for each; for example, the candidate may have the option to interview at different offices which each have different schedules and different interview times, or the candidate may have the option to interview in person in a first set of timeslots or by phone or video chat in a second set of timeslots. In an exemplary embodiment, these timeslots may be exclusive to the candidate, or may be shared among other candidates; according to an exemplary embodiment wherein these timeslots are shared among other candidates (and are, for example, first-come-first-served), the candidate may be notified if some or all of the listed timeslots have been filled by other candidates.

A response may then be solicited from the candidate, and the candidate's response 721 may be evaluated. A candidate's response may be, for example, an acceptance of the offer to interview at a particular time, a rejection of the offer to interview at a particular time (which may include, for example, an extended period of nonresponse, which may be treated as a rejection), or a request for a new time from the candidate.

According to an exemplary embodiment, when a candidate has accepted an offer to perform an interview at a particular time, a schedule may be created 73. In an exemplary embodiment, a schedule entry may be created in a machine-based calendar or multiple machine-based calendars (such as a MICROSOFT OUTLOOK calendar) for either or both of the candidate and the interviewer. For example, according to an exemplary embodiment, a candidate may be emailed a calendar entry that may be integrated, from their email inbox, into a calendar.

According to an exemplary embodiment, a candidate may request a new time for an interview. According to an exemplary embodiment, this may result in a repeat of one or more of the previous steps. For example, one or more timeslots previously reserved to another candidate may be freed in a schedule of a hiring manager or recruiter, or one or more timeslots previously reserved to events other than conducting interviews may be freed. The candidate may then be notified about the new timeslots 72 and a response from the candidate may be solicited.

According to an exemplary embodiment, a candidate may reject an offer to interview at a particular time. According to an exemplary embodiment, the candidate may only be provided with the option to do this after the candidate has already indicated a level of interest in the opportunity; as such, according to an exemplary embodiment, the candidate may be asked why they have declined the opportunity to interview 74. In an exemplary embodiment, a request for a reason why the candidate has declined an interview may include one or more preselected options (such as the candidate having received a more promising interview or offer elsewhere, or the candidate having changed personal circumstances resulting in them no longer being able to pursues that position) or may include an open-ended response option.

In an exemplary embodiment, when the candidate has provided a response 741, the response may be stored and may be processed 75 in order to improve the process. The response of the candidate may optionally be used by an AI or by an inference engine in order to improve future evaluations of candidates. For example, if many candidates are declining interviews because there is too much time taken between the first steps and the last steps of the method, the responses of the candidates may be stored and may be used to show that the speed of the process needs to be improved. In either case, when the candidate has or has not provided a response, the candidate may be removed in a removal step 53.

Candidates may also be requested to provide scheduling information. In an exemplary embodiment, it may be desirable to try to schedule an interview with the candidate immediately after the candidate has been identified as acceptable and approved by a hiring manager. In such an embodiment, the candidate may be requested to provide a date and time, a set of dates and times, or a timeframe window in which they can be available for an interview. In some embodiments, candidates may be solicited for scheduling information for different types of interviews, such as, for example, in-person interviews, video-chat interviews, or phone interviews or interviewed conducted by SMS/Text or some other type of platform each of which the candidate may have different levels of availability for. In some exemplary embodiments, the candidate may be given lower priority or may be disqualified from applying for the position based on their availability for an interview; for example, if the candidate would not be able to attend an in-person interview for a long period of time, they may not be considered for a position that demands immediate consideration of the candidates.

According to an exemplary embodiment, interview scheduling information, as well as any other information that may have to do with setting dates and times for events, may be handled by a web-based or machine-based calendar system. In an exemplary embodiment, any party involved in the process, such as the candidate, the recruiter, the hiring manager, a department manager involved with the hiring process, or any other party, may be able to propose, accept, reject, and/or modify entries in the calendar system. Such parties may also be able to directly create, edit, and delete events in the calendar system, may be able to invite participants, may be able to specify participation requirements, or may have any other functionality available to them, as desired. Alternatively, in some embodiments, some parties may have freer access and other parties may have more restricted access to the calendar system; for example, in an exemplary embodiment, a candidate may be able to propose a date and time for an event, but only the hiring manager may be able to approve a proposed date and time for the event. In an exemplary embodiment, the parties that have access to the calendar system may have such functionality available to them throughout the hiring process, or only at specific times during the hiring process, as desired.

As discussed briefly, a system may be configured to handle and respond to a number of types of response, over a number of different communication channels, which may be provided by a candidate. In some embodiments, candidates may be able to apply for a position or schedule or accept an interview using any communication method over any acceptable communication channel. This may include, for example, calling the recruiter, sending a message to the recruiter requesting a call back at a particular time, visiting a web form either directly (e.g. by searching) or by a provided hyperlink, replying to an email or sending an email to a recruiter or to an email address of the system, replying to a posting on a job board, replying using SMS or another form of text messaging, or any other acceptable communication method, as may be desired.

Figure 8:
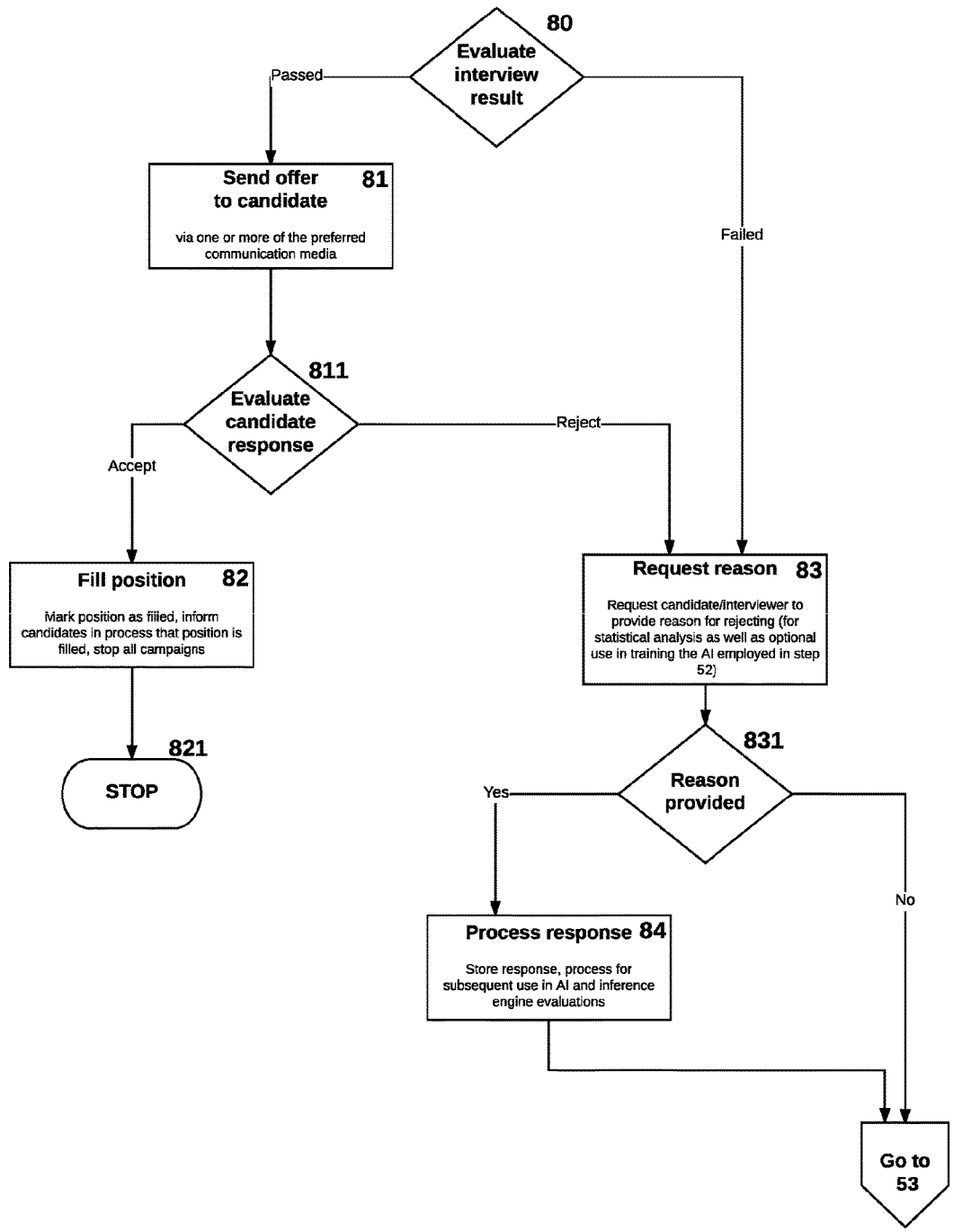
FIG. 8 is an exemplary embodiment of a flowchart depicting a method of performing an offer and acceptance step.

In an exemplary embodiment, once one or more interviews have been completed, an offer step 8 may be performed. Such a step may be shown in more detail in exemplary FIG. 8.

According to an exemplary embodiment, in a first part of an offer step 8, an interview result may be evaluated 80. The candidate may be considered to have passed or have failed the interview, or may be considered to be borderline and an additional interview may be conducted.

If the candidate is considered to have failed the job interview, this information may be provided to the system, and the system may request a reason 83 from the interviewer or other reviewer as to why the candidate failed or was otherwise rejected. In some exemplary embodiments, this may be used for the purpose of conducting statistical analysis on the one or more candidates for the position, on one or more candidates considered to have been improperly selected by the system, or any other statistical analysis that may be considered to be useful. In some exemplary embodiments, the reasons 83 provided by the interviewer may be used to further train the AI employed in previous steps, such as step 52.

Once a reason has been provided, or if a reason is provided 831, the response may be stored and may be processed for use in subsequent AI and/or inference engine evaluations 84. The system may then proceed to a step of removing the candidate 53.

If the candidate is considered to have passed the job interview, this information may be provided to the system, and the system may be configured to automatically generate and send an offer to the candidate via one or more of the preferred communication media 81. In an exemplary embodiment, the response of the candidate may then be evaluated 811. In an exemplary embodiment, this response may be considered to be an acceptance, a rejection, or a counteroffer.

In an exemplary embodiment wherein the candidate accepts the job offer, the system may mark the position as having been filled 82. In an exemplary embodiment, once the position has been filled, the system, or the hiring manager or any other party, may then notify the other candidates that the position has been filled and confirmed.

The system may then stop all campaigns for the position and stop the hiring process for the position 821.

In an exemplary embodiment wherein the candidate presents a counteroffer, in an exemplary embodiment, the system may direct the counteroffer to the hiring manager. In some exemplary embodiments, a counteroffer may be handled similarly to an acceptance or similarly to a rejection. In one exemplary embodiment, the position may preliminarily be marked as filled while the negotiation is being conducted; in another exemplary embodiment, the system may solicit other acceptable candidates in order to attempt to find a candidate that accepts the offer without modification. In still other exemplary embodiments, anything other than an acceptance may be counted as a rejection.

In an exemplary embodiment wherein the candidate rejects the job offer, a reason may be requested from the candidate as to why the job offer was rejected 83. In an exemplary embodiment, such a reason may be used to better train an AI used in previous steps. In an alternative exemplary embodiment, such a reason may be evaluated by a hiring manager and read in order to see if the candidate had intended to provide a counteroffer or otherwise expressed continued interest in the position. The system may also be configured to evaluate whether the candidate had intended to provide a counteroffer or otherwise expressed continued interest in the position, and may be configured to contact a hiring manager if it discovers either.

Once a response has been solicited 83, if the reason is provided 831, it may be processed 84. The system may then proceed back to a step of removing the candidate 53.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

For example, in some exemplary embodiments, it may be desired to structure the above invention as a Software as a Service (SaaS) platform, which may be accessible through a public API. According to such an exemplary embodiment, one or more clients, who may for example be hiring managers at outside companies, may make use of the public API to send jobs to the SaaS platform. The SaaS platform will then operate to generate a curated list of candidates for submission back to the client, which may be, for example, delivered directly into the application tracking system of the client. In some exemplary embodiments, some or all (or none) of the above processes may be made accessible by a public API, as may be desired.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A computer-implemented method for performing automated recruitment to a position, the method comprising:
receiving, on an automated recruitment system, a job description;
parsing, with the automated recruitment system, the job description, the step of parsing the job description comprising identifying a plurality of job requirements by performing natural language processing (NLP) on a textual job description;

generating, on the automated recruitment system, a first data point matrix, the first data point matrix comprising a multi-dimensional data structure defined by a plurality of axes and having a plurality of data points defined thereupon, wherein the step of generating the first data point matrix comprises defining, for each axis in the plurality of axes, a job concept to which the axis corresponds, defining the plurality of data points at specific locations on each of the plurality of axes based on a relation of the plurality of job requirements of the job description to the job concepts, and defining a first relation between the plurality of data points;

automatically posting, with the automated recruitment system, on a network, one or more posts comprising the job description;

automatically maintaining, with the automated recruitment system, the one or more posts;

for a plurality of candidates, performing the steps of:

receiving, on the automated system, a sourced résumé of a candidate in the plurality of candidates, and parsing the sourced résumé, the step of parsing the sourced résumé comprising identifying a plurality of hiring information entries for the candidate;

generating, on the automated recruitment system, a second data point matrix, the second data point matrix comprising a multi-dimensional data structure defined by a plurality of axes and having a plurality of data points defined thereupon, wherein the step of generating the second data point matrix comprises defining, for each axis in the plurality of axes, the job concept to which the axis corresponds, defining the plurality of data points at specific locations on each of the plurality of axes based on a relation of the plurality of hiring information entries to the job concepts, and defining a second relation between the plurality of data points;

generating, with a semantic engine of the automated recruitment system, a candidate score for the candidate by matching the plurality of hiring information entries in the second data point matrix to the plurality of job requirements in the first data point matrix by comparing the first relation to the second relation;

dynamically generating and automatically sending, with the automated recruitment system, at least one contact message by at least one communications medium to the candidate, the at least one contact message comprising an offer to apply for a position;

receiving, on the automated recruitment system, a response of the candidate;

evaluating, on the automated recruitment system, the response of the candidate;

determining, with the automated recruitment system, whether the response of the candidate is an intent to apply, and, when the response of the candidate is an intent to apply, adding the candidate to a curated list for submission;

determining, with the automated recruitment system, whether the response of the candidate is a rejection, and, when the response of the candidate is a rejection, removing the candidate from a recruitment campaign; and determining, with the automated recruitment system, whether the response of the candidate is a question, and, when the response of the candidate is a question, determining if the question matches an entry in an auto-response database of the automated recruitment system, and performing at least one of:

when the question matches an entry in the auto-response database, automatically generating, with an AI chat bot, a response to the question from the entry in the auto-response database and at least one of the one or more job requirements or the hiring information for the candidate, and when the question does not match an entry in the auto-response database, sending a notification to an operator of the automated recruitment system indicating that the question cannot be automatically responded to; and submitting, with the automated recruitment system, the curated list, the curated list comprising at least one candidate.

2. The method of claim 1, further comprising generating, from the one or more job requirements, at least one job profile search string for at least one of a job board search engine, a social media site, or a general-purpose search engine, the at least one job profile search string comprising one or more desired aspects of a new candidate job profile.

3. The method of claim 1, wherein the step of automatically posting, with the automated recruitment system, on a network, one or more posts comprising the job description further comprises:

automatically generating, from the job description, a base post;

automatically formatting the base post into one or more site-specific posts, each of the site-specific posts having a format used by a specific website, wherein formatting a site-specific post in the one or more site-specific posts comprises:

determining if the website is a professional page or a social page;

when the website is determined to be the professional page, selecting a first level of detail to be provided in the site-specific post, and generating the site-specific post from the base post based on the first level of detail; and when the website is determined to be the social page, selecting a second level of detail less than the first level of detail, generating the site-specific post from the base post based on the second level of detail, and inserting a link into the site-specific post to another posting; and posting the site-specific posts on the specific websites.

4. The method of claim 1, further comprising:

identifying a website that does not permit at least one of automatic posting or automatic maintenance of posting by authenticated users;

automatically generating at least one of a post to be made on the website, or an edit to be applied to a post on the website;

generating and sending a notification to an operator of the automated recruitment system, the notification further comprising at least one of the post to be made on the website or the edit to be applied to the post on the website.

5. The method of claim 1, wherein the step of automatically maintaining, with the automated recruitment system, the one or more posts comprises at least one of updating the one or more posts to include new job description information, removing the one or more posts, or applying a visibility adjustment to the one or more posts.

6. The method of claim 1, wherein the plurality of candidates comprises a primary group, the primary group comprising candidates having a candidate score in excess of a primary score threshold;

wherein the plurality of candidates further comprises a secondary group, the secondary group comprising candidates having a candidate score in excess of a secondary score threshold but below the primary score threshold; and wherein the step of automatically sending, with the automated recruitment system, a contact message to the candidate, the contact message comprising an offer to apply for a position is performed for each of the candidates in the primary group before being performed for any of the candidates in the secondary group.

7. The method of claim 1, wherein, when the response of the candidate is a rejection, the candidate is excluded from receiving at least one category of offer for at least one period of time, the at least one category of offer comprising at least one of offers in a particular industry segment, offers having a specific job title, offers having a specific job description, offers having a specific job location, or offers having a specific salary.

8. The method of claim 1, further comprising, when the response of the candidate is a question and not an intent to apply or a rejection, sending a further communication to the candidate requesting a second response.

9. The method of claim 1, further comprising, for a plurality of candidates, prior to the step of generating a candidate score, performing a pre-processing step, the pre-processing step comprising filtering the plurality of candidates by comparing the hiring information for the candidate to a threshold value.

10. The method of claim 1, wherein the step of dynamically generating and automatically sending at least one contact message by at least one communications medium comprises generating and sending a first contact message by SMS text messaging and generating and sending a second contact message by email.

11. The method of claim 1, wherein the step of dynamically generating and automatically sending at least one contact message by at least one communications medium comprises generating and sending the at least one contact message based on information parsed from a candidate profile or based on an action taken by the candidate.

12. The method of claim 1, wherein the step of, when the response of the candidate is an intent to apply, adding the candidate to a curated list for submission comprises at least one of:
    sending, to the candidate, by the automated system, a link directing the candidate to an application page; collecting one or more details from the candidate from the application page; and adding the candidate to a curated list for submission; or
    automatically generating, with the automated recruitment system, one or more questions directed to details required from the candidate prior to submission; automatically sending the one or more questions to the candidate; receiving a response from the candidate on the automated recruitment system; and adding the candidate to a curated list for submission.

13. The method of claim 1, further comprising receiving, on the automated recruitment system, after the curated list has been submitted, a rejection of at least one candidate on the curated list; and
    automatically generating and sending, with the automated recruitment system, a request for explanation of the rejection.

14. The method of claim 1, wherein, when the question is recognized as a question but does not match an entry in the auto-response database, the method further comprises updating the auto-response database with a self-teaching algorithm to include the question; and
    when the question does not match an entry in the auto-response database, concurrently generating and automatically sending a response to the candidate, wherein the generated response is selected to include a subject different from an immediately previous communication with the candidate.

15. The method of claim 1, wherein the plurality of hiring information entries for the candidate comprises at least one of the set of: a candidate job title, a candidate period of employment, candidate work history, a candidate educational qualification, or a candidate desired salary.

16. A system for performing automated recruitment, the system comprising a processor, a communication channel, and a non-transitory computer-readable memory, the non-transitory computer-readable memory comprising code executable by the processor to cause it to carry out the following steps:
    receiving, on an automated recruitment system, a job description;
    parsing, with the automated recruitment system, the job description, the step of parsing the job description comprising identifying a plurality of job requirements by performing natural language processing (NLP) on a textual job description;
    generating, on the automated recruitment system, a first data point matrix, the first data point matrix comprising a multi-dimensional data structure defined by a plurality of axes and having a plurality of data points defined thereupon, wherein the step of generating the first data point matrix comprises defining, for each axis in the plurality of axes, a job concept to which the axis corresponds, defining the plurality of data points at specific locations on each of the plurality of axes based on a relation of the plurality of job requirements of the job description to the job concepts, and defining a first relation between the plurality of data points;
    automatically posting, with the automated recruitment system, on a network, one or more posts comprising the job description;
    automatically maintaining, with the automated recruitment system, the one or more posts;
    for a plurality of candidates, performing the steps of:
    receiving, on the automated system, a sourced résumé of a candidate in the plurality of candidates, and parsing the sourced résumé, the step of parsing the sourced résumé comprising identifying a plurality of hiring information entries for the candidate;
    generating, on the automated recruitment system, a second data point matrix, the second data point matrix comprising a multi-dimensional data structure defined by a plurality of axes and having a plurality of data points defined thereupon, wherein the step of generating the second data point matrix comprises defining, for each axis in the plurality of axes, the job concept to which the axis corresponds, defining the plurality of data points at specific locations on each of the plurality of axes based on a relation of the plurality of hiring information entries to the job concepts, and defining a second relation between the plurality of data points;
    generating, with a semantic engine of the automated recruitment system, a candidate score for the candidate by matching the plurality of hiring information entries in the second data point matrix to the plurality of job requirements in the first data point matrix by comparing the first relation to the second relation;

dynamically generating and automatically sending, with the automated recruitment system, at least one contact message by at least one communications medium to the candidate, the at least one contact message comprising an offer to apply for a position;

receiving, on the automated recruitment system, a response of the candidate;

evaluating, on the automated recruitment system, the response of the candidate;

determining, with the automated recruitment system, whether the response of the candidate is an intent to apply, and, when the response of the candidate is an intent to apply, adding the candidate to a curated list for submission;

determining, with the automated recruitment system, whether the response of the candidate is a rejection, and, when the response of the candidate is a rejection, removing the candidate from a recruitment campaign; and determining, with the automated recruitment system, whether the response of the candidate is a question, and, when the response of the candidate is a question, determining if the question matches an entry in an auto-response database of the automated recruitment system, and performing at least one of:

when the question matches an entry in the auto-response database, automatically generating, with an AI chat bot, a response to the question from the entry in the auto-response database and at least one of the one or more job requirements or the hiring information for the candidate, and when the question does not match an entry in the auto-response database, sending a notification to an operator of the automated recruitment system indicating that the question cannot be automatically responded to; and submitting, with the automated recruitment system, the curated list, the curated list comprising at least one candidate.

17. The system of claim 16, wherein the system is further configured to perform the step of generating, from the one or more job requirements, at least one job profile search string for at least one of a job board search engine, a social media site, or a general-purpose search engine, the at least one job profile search string comprising one or more desired aspects of a new candidate job profile.

18. The system of claim 16, wherein the plurality of candidates comprises a primary group, the primary group comprising candidates having a candidate score in excess of a primary score threshold;

wherein the plurality of candidates further comprises a secondary group, the secondary group comprising candidates having a candidate score in excess of a secondary score threshold but below the primary score threshold; and wherein the step of automatically sending, with the automated recruitment system, a contact message to the candidate, the contact message comprising an offer to apply for a position is performed for each of the candidates in the primary group before being performed for any of the candidates in the secondary group.

19. The system of claim 16, wherein the system is further configured to, when the response of the candidate is a question and not an intent to apply or a rejection, send a further communication to the candidate requesting a second response.

20. The system of claim 16, wherein the step of, when the response of the candidate is an intent to apply, adding the candidate to a curated list for submission comprises at least one of:

automatically generating, with the automated recruitment system, one or more questions directed to details required from the candidate prior to submission;

automatically sending the one or more questions to the candidate;

receiving a response from the candidate on the automated recruitment system; and adding the candidate to a curated list for submission.

* * * * *